US008650402B2

(12) United States Patent
Au et al.

(10) Patent No.: US 8,650,402 B2
(45) Date of Patent: Feb. 11, 2014

(54) GENERAL DATA HIDING FRAMEWORK USING PARITY FOR MINIMAL SWITCHING

(75) Inventors: Oscar Chi Lim Au, Hong Kong (CN); Richard Yuk Ming Li, Hong Kong (CN)

(73) Assignee: Wong Technologies L.L.C., Wilmington, DE (US)

( * ) Notice: Subject to any disclaimer, the term of this patent is extended or adjusted under 35 U.S.C. 154(b) by 1123 days.

(21) Appl. No.: 12/190,962

(22) Filed: Aug. 13, 2008

(65) Prior Publication Data

US 2009/0046850 A1 Feb. 19, 2009

Related U.S. Application Data

(60) Provisional application No. 60/956,457, filed on Aug. 17, 2007.

(51) Int. Cl.
*H04L 9/32* (2006.01)
(52) U.S. Cl.
USPC ........ 713/176; 358/3.28; 358/3.06; 358/3.26; 705/67; 705/75; 380/28
(58) Field of Classification Search
USPC ............. 713/176; 380/54, 28; 358/3.28, 3.06, 358/3.26; 705/67, 75
See application file for complete search history.

(56) References Cited

U.S. PATENT DOCUMENTS

| | | | | |
|---|---|---|---|---|
| 6,512,835 | B1 * | 1/2003 | Numao et al. | 382/100 |
| 6,862,362 | B2 * | 3/2005 | Gangadhar | 382/100 |
| 7,693,297 | B2 * | 4/2010 | Zhang et al. | 382/100 |
| 2003/0086609 | A1 | 5/2003 | Gangadhar | |
| 2003/0174857 | A1 | 9/2003 | Yu | |
| 2004/0228502 | A1 * | 11/2004 | Bradley et al. | 382/100 |
| 2005/0058318 | A1 * | 3/2005 | Rhoads | 382/100 |
| 2005/0147276 | A1 | 7/2005 | Powell et al. | |
| 2006/0257028 | A1 * | 11/2006 | Laurent et al. | 382/191 |
| 2006/0257053 | A1 * | 11/2006 | Boudreau et al. | 382/305 |
| 2006/0277530 | A1 * | 12/2006 | Wu et al. | 717/136 |
| 2007/0019837 | A1 * | 1/2007 | Powell et al. | 382/100 |
| 2008/0130883 | A1 * | 6/2008 | Agaian et al. | 380/54 |
| 2008/0260261 | A1 * | 10/2008 | Li et al. | 382/209 |

OTHER PUBLICATIONS

Huijuan Yang; Pattern-Based Data Hiding for Binary Image Pattern-Based Data Hiding for Binary Image; Apr. 2007; IEEE; pp. 1-12.*
International Search Report and Written Opinion dated Nov. 4, 2008 for PCT Application Serial No. PCT/US08/73219, 9 Pages.

* cited by examiner

*Primary Examiner* — April Y Blair
(74) *Attorney, Agent, or Firm* — Turocy & Watson, LLP

(57) ABSTRACT

A framework is provided for reducing the number of locations modified when hiding data, such as a digital watermark, in binary data. The framework complements data hiding techniques, such as digital watermarking techniques. After determining potential embedding locations according to an underlying technique, a data structure is created with values associated with those locations. A parity calculation is performed on the values in the data structure. The calculated parity is compared with hidden data to determine locations for modifications. Manipulations are then performed to reduce the total number of modifications needed to represent the hidden data. Modifications are made to the binary data according to the underlying technique. During decoding of the hidden data, the same locations can be determined, the same data structure can be created with the modified values, and a parity calculation is then performed to decode the hidden data.

24 Claims, 21 Drawing Sheets

FIG. 6

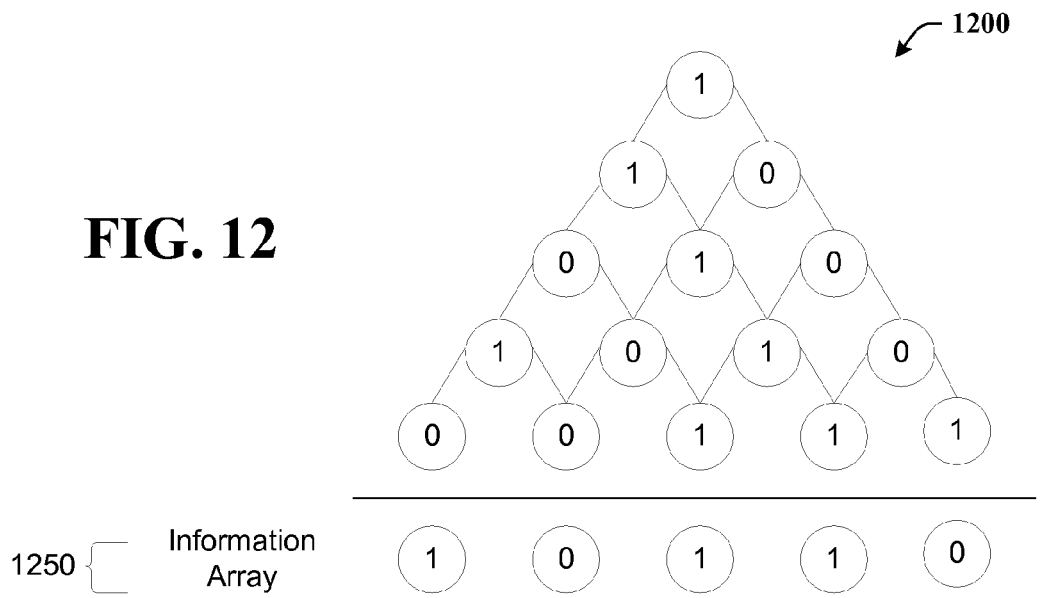
FIG. 12
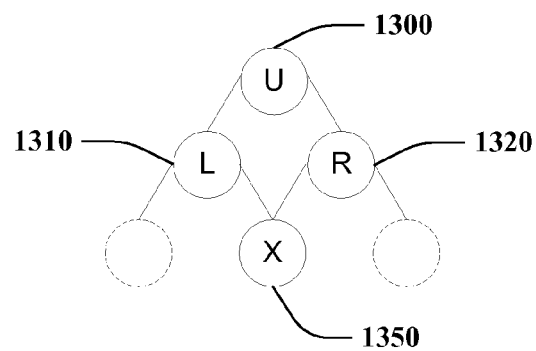
FIG. 13
FIG. 14
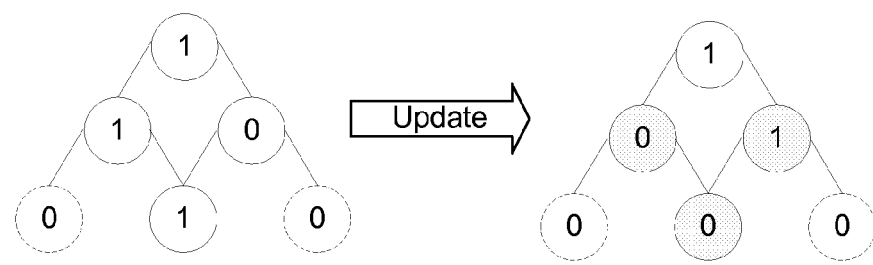

GENERAL DATA HIDING FRAMEWORK USING PARITY FOR MINIMAL SWITCHING

CROSS-REFERENCE TO RELATED APPLICATIONS

This application claims priority to U.S. Provisional Application Ser. No. 60/956,457, filed on Aug. 17, 2007, entitled "GENERAL DATA HIDING FRAMEWORK USING PARITY FOR MINIMAL SWITCHING", the entirety of which is incorporated herein by reference.

TECHNICAL FIELD

The subject disclosure relates to data hiding in binary data, and to encoding and decoding hidden data, such as a digital watermark, in binary media.

BACKGROUND

Computerized applications have become more and more popular. With advances in information technology, numerous amounts of binary data, such as text, images, music, and videos, are widely accessible, such as on web pages. The binary data can be easily downloaded and distributed or linked to by users, and in some cases, for unauthorized purposes. Digital watermarking is one of the solutions to prove the ownership and authenticity by hiding binary information, such as a random sequence or logo, into the digital media.

However, encoding hidden data, such as a digital watermark, into binary data is prone to undesirable distortion. For example, when hidden data is encoded into an image, the image with the hidden data can include undesirable effects such as visual distortion. Similarly, when hidden data is encoded into audio binary data, such as music data, the music data is prone to undesirable aural distortion. This distortion can be especially problematic for certain types of binary data, such as halftone images.

In this regard, most conventional data hiding techniques, such as conventional digital watermarking techniques, are designed for particular types of binary data, such as multitone images, and are not suitable for other types of binary data, such as halftone images. Other conventional data hiding techniques are not efficient in reducing the number of modifications for a given size of hidden data. Thus, more distortion of the binary data is likely to result from the relatively large number of modifications performed.

The above-described deficiencies and limitations of current data hiding methods are merely intended to provide an overview of some of the problems of today's data hiding techniques, and are not intended to be exhaustive. As such, other problems with the state of the art can become further apparent upon review of the description of various non-limiting embodiments that follow.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follows.

A framework is provided for reducing the number of locations modified when hiding data, such as a digital watermark, in binary data. After determining potential embedding locations using an underlying technique, a data structure is created with values associated with those locations. A parity calculation is performed on the values in the data structure. A comparison is made between the obtained parity for at least a portion of the data structure and data to be hidden. Manipulations are performed to reduce the total number of modifications used to encode the data. Subsequently, the image is modified in determined locations according to the underlying technique so the hidden data is encoded in the image.

During decoding, the same locations are determined, such as by a list of potential embedding locations in the side information or according to an algorithm based on the underlying technique. The same type of data structure used in encoding can be created using those locations in the same order as during encoding. A parity calculation is performed, as well as any additional processing, to recover the hidden data. Other non-limiting embodiments and further details are provided below.

BRIEF DESCRIPTION OF THE DRAWINGS

The system and methods for encoding and decoding hidden data into binary data are further described with reference to the accompanying drawings in which:

FIG. 6 is a schematic diagram correlating a block in a master map with parity values in a parity map according to one embodiment;

FIG. 12 illustrates parity calculation for the champagne pyramid representation of data;

FIG. 13 illustrates various nodes in the champagne pyramid representation of data that are exploited to achieve a more efficient parity calculation;

FIG. 14 illustrates a value update while performing an efficient parity calculation;

DETAILED DESCRIPTION

Overview

Figure 1:
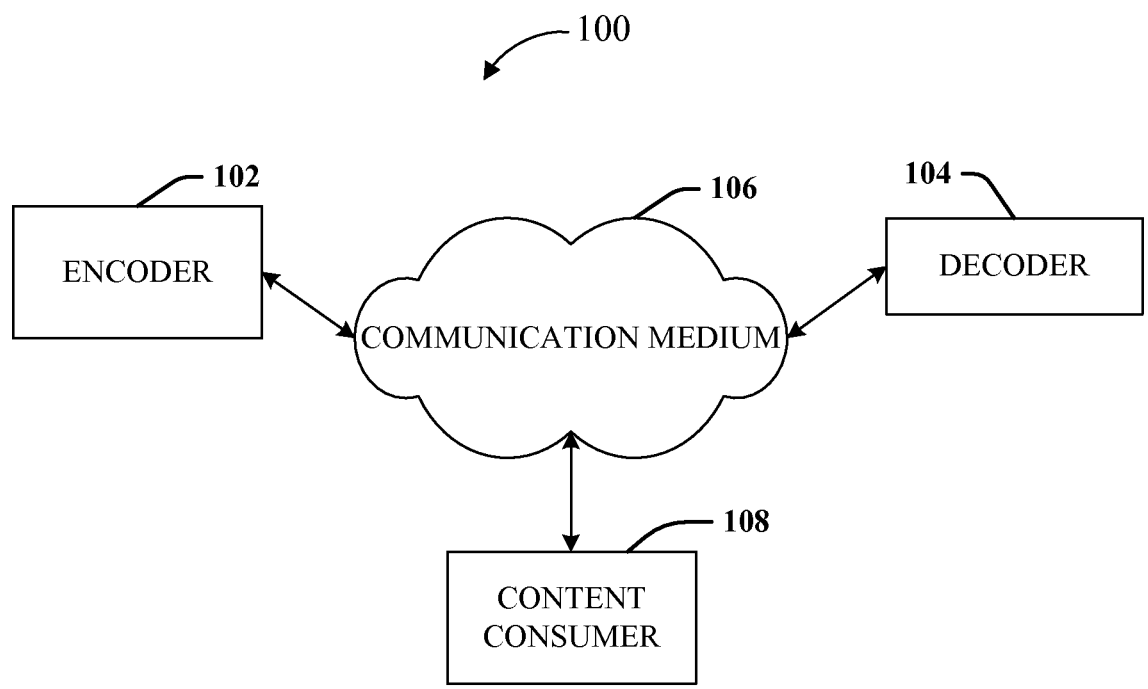
FIG. 1 is a schematic block diagram of an exemplary environment operable to encode/decode hidden data, and to present the binary data to a content consumer.

Referring now to FIG. 1, there is illustrated a schematic block diagram of an exemplary environment operable to present binary data, encode hidden data, and decode hidden data. For the sake of clarity, a single system of each type is illustrated, but one skilled in the art can appreciate that there can be multiple computers of a given environment type and that some of the environment types can have their functionality distributed between two or more computing machines. Furthermore, one can appreciate that some or all of the types, in some embodiments, can be performed on a single computing device.

Environment 100 includes an encoder 102. The encoder 102 can be hardware and/or software (e.g., threads, processes, computing devices). The encoder 102 inserts hidden data into binary data, such as images, music, and videos. In some embodiments, there can be multiple encoders using different underlying techniques and/or different parameters for the same underlying technique. In exemplary non-limiting embodiments, selection of the appropriate underlying technique can be determined manually.

The environment 100 also includes a decoder 104. The decoder 104 can also be hardware and/or software (e.g., threads, processes, computing devices). The decoder 104 retrieves the hidden data by decoding the encoded data. One possible communication between an encoder 102 and a decoder 104 can be in the form of data packets or messages adapted to be transmitted between two or more computer processes. Data packets can include data representing the binary data, as well as side information. Side information facilitates decoding and can include a list of the potential embedding locations, or one or more parameters from the underlying technique used to generate the locations, a map between those locations and the locations in the created data structure, or another indication of the ordering technique, the type of data structure used, various processing instructions, e.g., whether a not operation was used to reduce the number of modifications, or other information for the underlying technique that is used during decoding by decoder 104.

The environment 100 also includes a content consumer 108. The content consumer 108 can also be hardware and/or software (e.g., threads, processes, computing devices). The content consumer 108 presents the binary data to a user directly or indirectly via a presentation device (not shown) and/or stores the binary data for future processing, e.g., distribution, storage and/or presentation to a user. In some embodiments, the content consumer 108 and/or its user are aware of the hidden data. For example, media companies can indicate that certain images, music or videos are watermarked to deter unauthorized copying. In a second example, in at least one embodiment, the content consumer/presenter 108 and decoder 104 are executing on the same machine and that machine verifies authenticity before presenting the binary data to the user. In other embodiments, the content consumer 108 is unaware of the hidden data, except to the extent that distortions are detectable by a content consumer 108, such as when the hidden data is not a digital watermark, but instead a hidden message.

The environment 100 includes a communication framework 106 (e.g., a global communication network, such as the Internet; a computer-readable storage medium such as a tape, DVD, flash memory, hard drive, etc.; or the public switched telephone network) that can be employed to facilitate communications between the encoder 102, decoder 104 and content consumer 108. Network communications can be facilitated via a wired (including optical fiber) and/or wireless technology and via a packet-switched or circuit-switched network. The communications can include one or more pieces of raster media encoded with hidden data and optionally side information. Different communications can be performed via different communication means. For example, the side information can be transmitted by a computer-readable storage medium while the binary data with the hidden data can be transmitted over the Internet.

Figure 2:
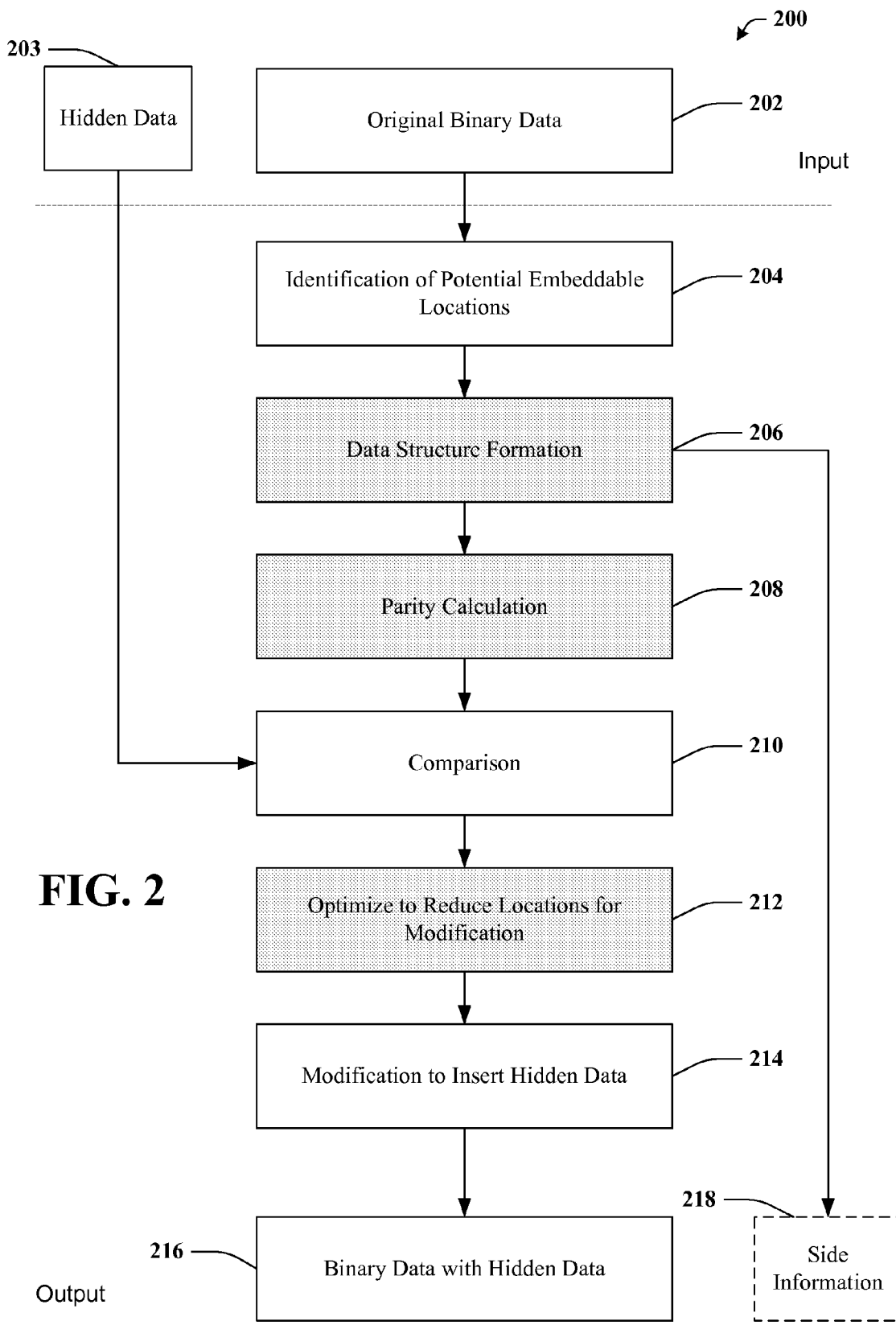
FIG. 2 is a high-level data flowchart of a framework for encoding binary data according to one embodiment.

Referring to FIG. 2, a high-level data flowchart of a data hiding framework 200 is illustrated. Both original binary data 202 and hidden data 203 are inputs to the framework. Binary data 202 can include, but is not limited to, images or video frames. Hidden data 203 can include, but is not limited to, a logo or a unique bit string. Initially, at 204, potential embeddable locations of binary data 202 are determined using an underlying technique. For example, depending on the technique, locations, such as pixels in an image or video frame, are identified in a pseudo-random manner or in an edge region. After determining potential embedding locations using an underlying technique at 204, a data structure is created at 206 with values associated with those locations.

For example, in a halftone image, the values can be represented as '1' for a black pixel and '0' for a white pixel. One can appreciate that the values can represent image values other than pixel values, such as coefficients (in non-spatial domains), or an alpha channel transparency. One can also appreciate that non-single bit values can be transformed into single bit values for easier processing. For example, a '1' can be assigned to an opaque pixel and '0' can be assigned to a semi-transparent pixel. While an image is used as an exemplary type of binary data herein, one can appreciate that other types of binary data can be utilized with the technique. In this regard, other types of binary data can have locations that correspond to same-size subparts of itself. Depending on the data structure and the underlying technique, side information 218 can be generated at 206.

At 208, a parity calculation is performed on the values in the data structure. In some embodiments, an efficient technique is used to compute parity based on the properties of the formed data structure. At 210, a comparison is made between the obtained parity for at least a portion of the formed data structure and the hidden data 203. This comparison can be made by performing an xor operation between an obtained parity bit and the bit to be encoded. A '1' can correspond to a location to be modified. At 212, optimizations are performed to reduce the total number of modifications that are to be used to encode the data. These optimizations can be based on the properties of the formed data structure and performed either on the formed data structure or on a newly formed toggle data structure.

At 214, the binary data is modified in the reduced number of locations according to an underlying technique so the hidden data is encoded in the binary data. The modifications, for example, can be a pixel toggle in a halftone image. The output of the framework is binary data with hidden data 216 and optionally side information 218.

Figure 3:
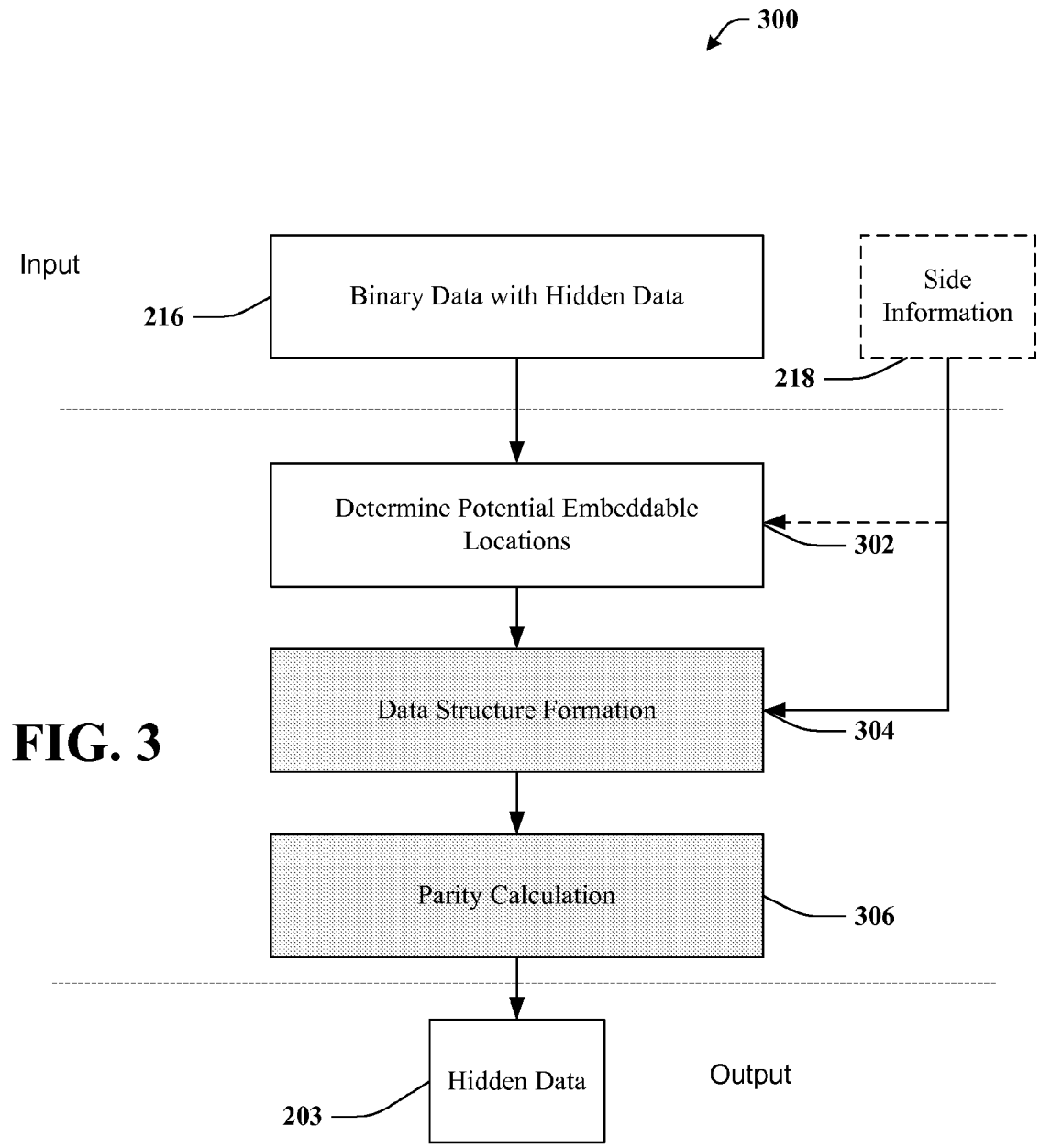
FIG. 3 is a high-level data flowchart of the framework for decoding encoded data according to one embodiment.

Referring to FIG. 3, a high-level data flow 300 of decoding hidden data, such as a digital watermark, is illustrated. Binary data with hidden data 216 and optionally side information 218 are used as input. At 302, the same locations are determined, such as by a list of potential embedding locations in the side information or according to the underlying technique. At 304, the same type of data structure used in encoding is created using those locations in the same order as during encoding. At 306, a parity calculation is performed, as well as any additional processing, to recover the hidden data 203. The decoded data can then be compared with the known hidden data for authentication.

Block Overlapping Parity Check Embodiment with Data Hiding Smart Pair Toggling

For the sake of simplicity and clarity, an embodiment involving a halftone image and using Data Hiding Smart Pair Toggling as the underlying technique is described below as an exemplary embodiment. One can appreciate that other types of binary data, other underlying techniques, other types of data structures, and multiple bit values can alternatively be utilized in other embodiments.

Block Overlapping Parity Check enhances the strength of Data Hiding Smart Pair Toggling and adds features to improve its performance. Data Hiding Smart Pair Toggling achieves good visual quality (e.g., less distortion) by smart pair toggling. Artifacts are found, although reduced, due to pair toggling in Data Hiding Smart Pair Toggling. Block-Overlapping Parity Check achieves better visual quality than normal Data Hiding Smart Pair Toggling by reducing the number of smart pair toggles under the same payload, or bits of hidden data.

Figure 4:
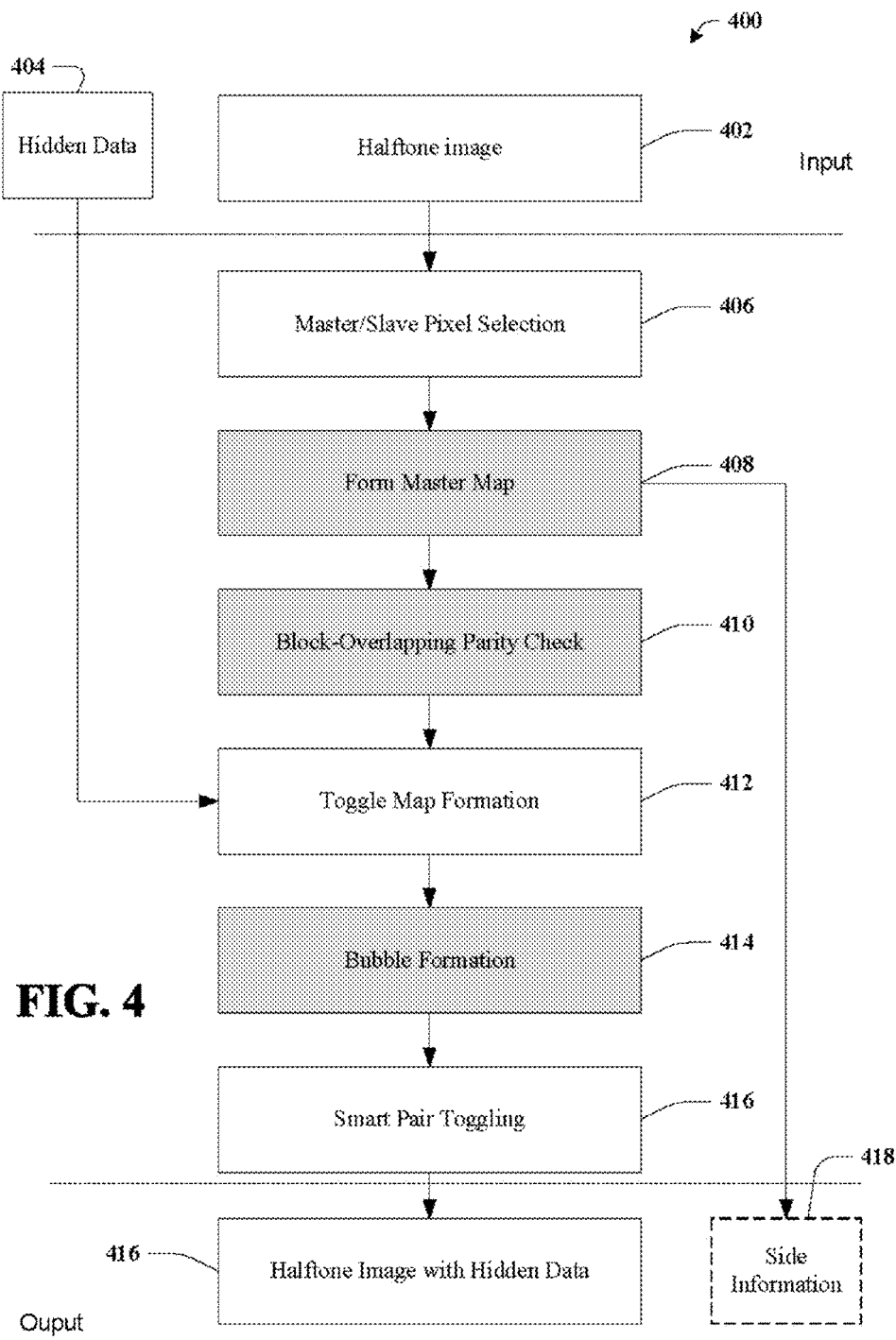
FIG. 4 is a high-level data flowchart according to one embodiment in which a master map is formed, where data hiding smart pair toggling is used as the underlying technique.

Referring to FIG. 4, a summary of the Block Overlapping Parity Check is illustrated. The flow is similar to FIG. 2. In particular, a halftone image 402 and hidden data 404 are inputs. At 406, master/slave pixel selection is performed. In particular, the master pixels are determined in a pseudo-random matter according to the underlying Data Hiding Smart Pair Toggling technique. Slave pixels surround the randomly selected master pixels. At 408, a master map is formed. During 408, information is saved as side information 418 to facilitate decoding. At 410, parity values are calculated according to block-overlapping parity check. At 412, a toggle map is created as part of comparing hidden data 404 to the parity values calculated in 410. At 414, bubble formation is performed to reduce the number of pixels to toggle. At 416, smart pair toggling is performed on the reduced number of locations. As a result, the output is a halftone image with hidden data 420 and side information 418.

In Block Overlapping Parity Check, a digital logo L with the size of $L_X \times L_Y$ is embedded into a host image S 500 with the size of $S_X \times S_Y$ to form an image with hidden data W Block Overlapping Parity Check uses several data structures including a master map, a parity map and a toggle map while encoding the hidden data.

Figure 5:
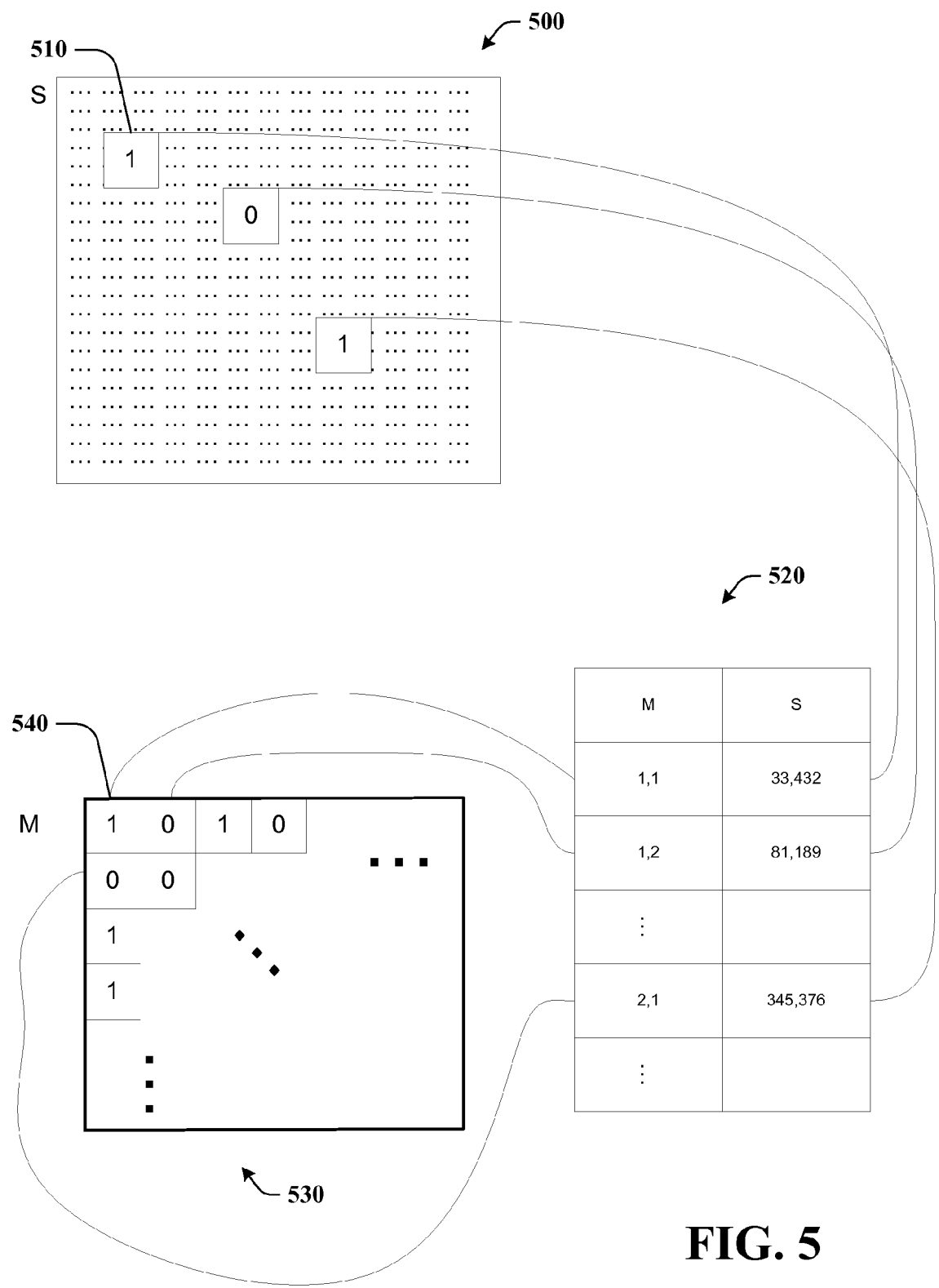
FIG. 5 is a schematic diagram of master map formation according to one embodiment.

In Block Overlapping Parity Check, pixels in S are divided into two groups, namely master pixels and slave pixels. Master pixels will be toggled, if necessary, to store the embedded logo data. When a master pixel is toggled, a neighboring slave pixel is typically toggled in a complementary way to preserve local intensity, similar to smart pair toggling in Data Hiding Smart Pair Toggling. In particular, in Smart Pair Toggling, a pair of master pixels and a neighboring slave pixel is toggled to maintain the same local intensity in the halftone image. A pseudo-random number generator with a known seed, K, is used to generate a set of $(2L_X+1) \times (2L_Y+1)$ pseudo-random locations on S. In some embodiments, the seed K is supplied as side information as an alternative to an ordered list of memory locations. The random locations can be master pixels, such as pixel 510, which are aggregated together to form a master map M 530 as shown in FIG. 5. The corresponding locations are stored in a location mapping table 520, which correlates locations in the image with locations in the master map. The master map has the value of the master pixel from the halftone image. For example, the value of pixel 510 is the value of the memory map element 540.

Figure 6:
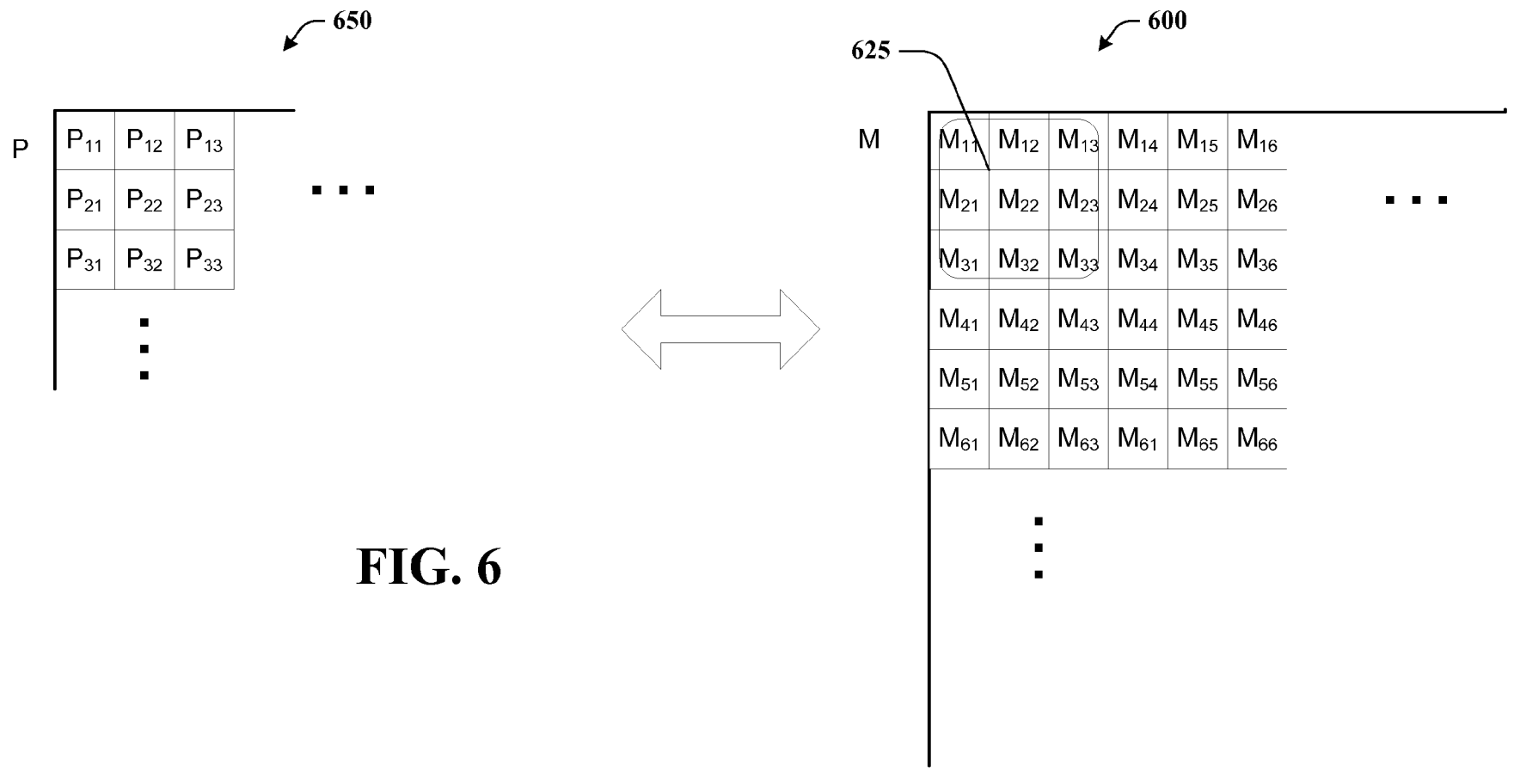

A master pixel can be surrounded by eight slave pixels in a 3×3 neighborhood. However, in other embodiments, a larger neighborhood can also be used. The elements in master map M 600 are divided into overlapping blocks with a 3×3 size (e.g., block 625) as shown in FIG. 6. Block Overlapping Parity Check hides one bit in the parity of a block in M. A parity map 650, P, with the size of $L_X \times L_Y$, is formed by block-overlapping parity check by using Equation (1):

$$P_{ij} = \left( \sum_{x=2i-1}^{2i+1} \sum_{y=2j-1}^{2j+1} M_{xy} \right) \mod 2 \qquad \text{Equation (1)}$$

In the locations where $P_{ij}$ is different from $L_{ij}$, the value of $P_{ij}$ should be toggled. A toggle map, T, is formed by comparing performing bitwise logical exclusive-OR (xor) between P & L, using Equation (2).

$$T_{ij} = P_{ij} \oplus L_{ij} \qquad \text{Equation (2)}$$

If $P_{ij}$ and $L_{ij}$ happen to be the same, $T_{ij}$ will be zero and toggling is not performed. If they are different and $T_{ij}$ is equal to '1', one of pixels in the block centered at $M_{(2i)(2j)}$ is toggled so that $P_{ij}$ will be equal to $L_{ij}$. In the master map, each of the blocks overlaps with neighbor(s). Thus, some master pixels are shared by more than one block. For $1 \leq i \leq L_X$ and $1 \leq j \leq L_Y$, the number of blocks sharing a master pixel at a given location is shown in Table 1. With the property shown above, Block Overlapping Parity Check achieves better visual quality by choosing a pixel to toggle in a smart way. As shown in table 2 below, a single toggling in M can result in one, two, or four information bits toggling in P. To minimize the total number of toggling in the host image, a process called bubble formation can be used.

TABLE 1

| Pixel location | Number of blocks changed |
|---|---|
| (2i, 2j) | 1 |
| (2i + 1, 2j)/(2i, 2j + 1) | 2 |
| (2i + 1, 2j + 1) | 4 |

TABLE 2

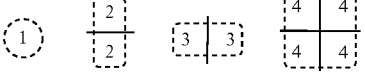

Figure 7:
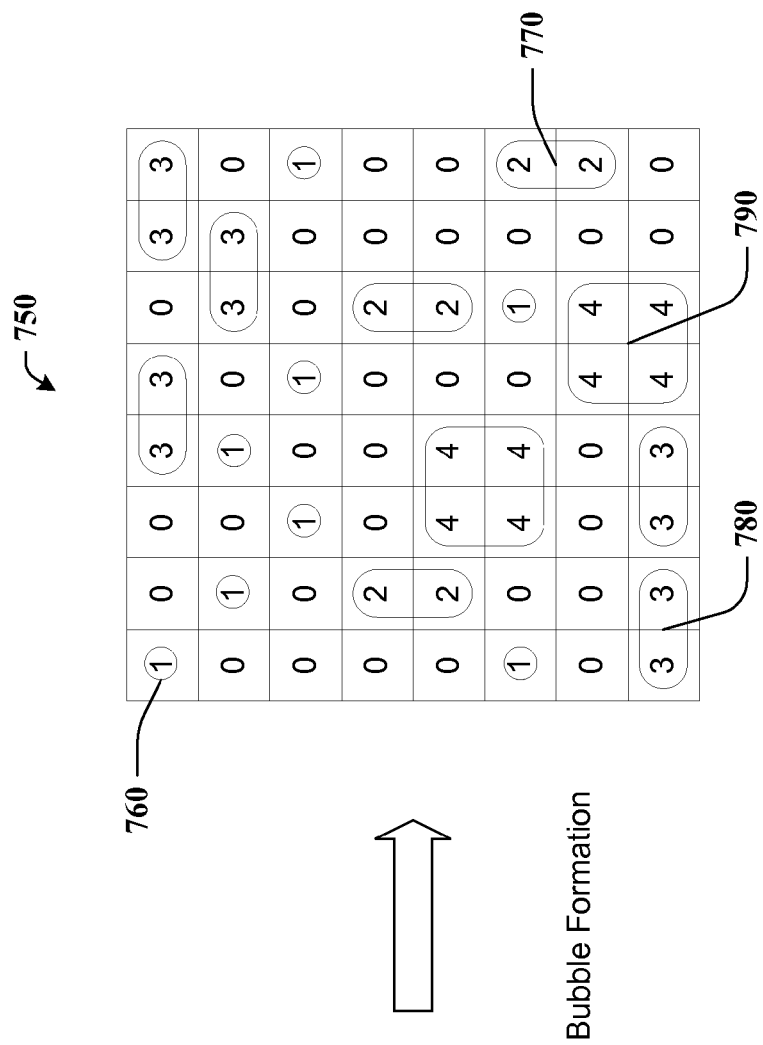
FIG. 7 is a block diagram illustrating bubble formation.

In an exemplary bubble formation process, every '1' in T is called an elementary bubble with a size of 1×1. Neighboring bubbles can be merged together to form a more complex bubble. Exemplary allowable bubble arrangements are illustrated in Table 2. The goal of bubble formation is to enclose all of the '1's in T by using the least number of bubbles. During bubble formation, the elements of T are updated to be the group number of the bubble. An exemplary bubble forming process is illustrated by the example shown in FIG. 7. In particular, FIG. 7 illustrates a toggle map 700 and the bubbles formed during bubble formation in modified toggle map 750. Bubbles 760, 770, 780, and 790 correspond to group 1, 2, 3, and 4 bubbles, respectively.

However, the complexity of finding the smallest number of bubbles can be high. Accordingly, in one embodiment, bubble formation is performed in two passes to provide an efficacious solution with low computational power.

In this exemplary embodiment, first, T is scanned in raster-scan order. Any group 4 bubbles (2×2 neighboring '1') are marked with the value '4'. T is then scanned in raster-scan order again. If an element $T_{ij}$ is '1' and can be grouped into either a group 2 or a group 3 bubble, the number of the consecutive '1's from $T_{ij}$ downward and rightward are checked. If the vertical run is even and horizontal run is odd, a group 2 bubble is chosen; otherwise, a group 3 bubble is chosen. One can appreciate that a tie-breaker can be performed in other ways too.

In bubble formation, the expected number of bubbles per embedded bit is related to the size of the hidden data. The expected number of bubbles decreases due to Conditions C1 and C2, as follows:

C1) the dimensions increase in either or both directions; and

C2) for the same payload, the difference between the dimensions decreases.

The reason for Condition C1 is that the more elements in T, the higher the chance for small bubbles merging together to form a larger bubble. Condition C2 favors the merging of bubbles by providing more interior edges. Recall that every bubble in this example represents a pair toggling in the host image, which leads to a drop in visual quality in the encoded image W. In Data Hiding Smart Pair Toggling, the expected number of toggling per embedded bit is theoretically 0.5. In Block Overlapping Parity Check, the expected number of bubbles (toggling) per embedded bit for a 128×128 logo is 0.26.

After the bubble formation process, the number of bubbles in this example represents the number of pixels to be toggled in M 800. The master pixel chosen by the technique for different bubble groups is shown in Table 3 below:

TABLE 3

| Group | Pixel location |
|---|---|
| 1 | $M_{2i, 2j}$ |
| 2 | $M_{2i+1, 2j}$ |

TABLE 3-continued

| Group | Pixel location |
|---|---|
| 3 | $M_{2i, 2j+1}$ |
| 4 | $M_{2i+1, 2j+1}$ |

Figure 8:
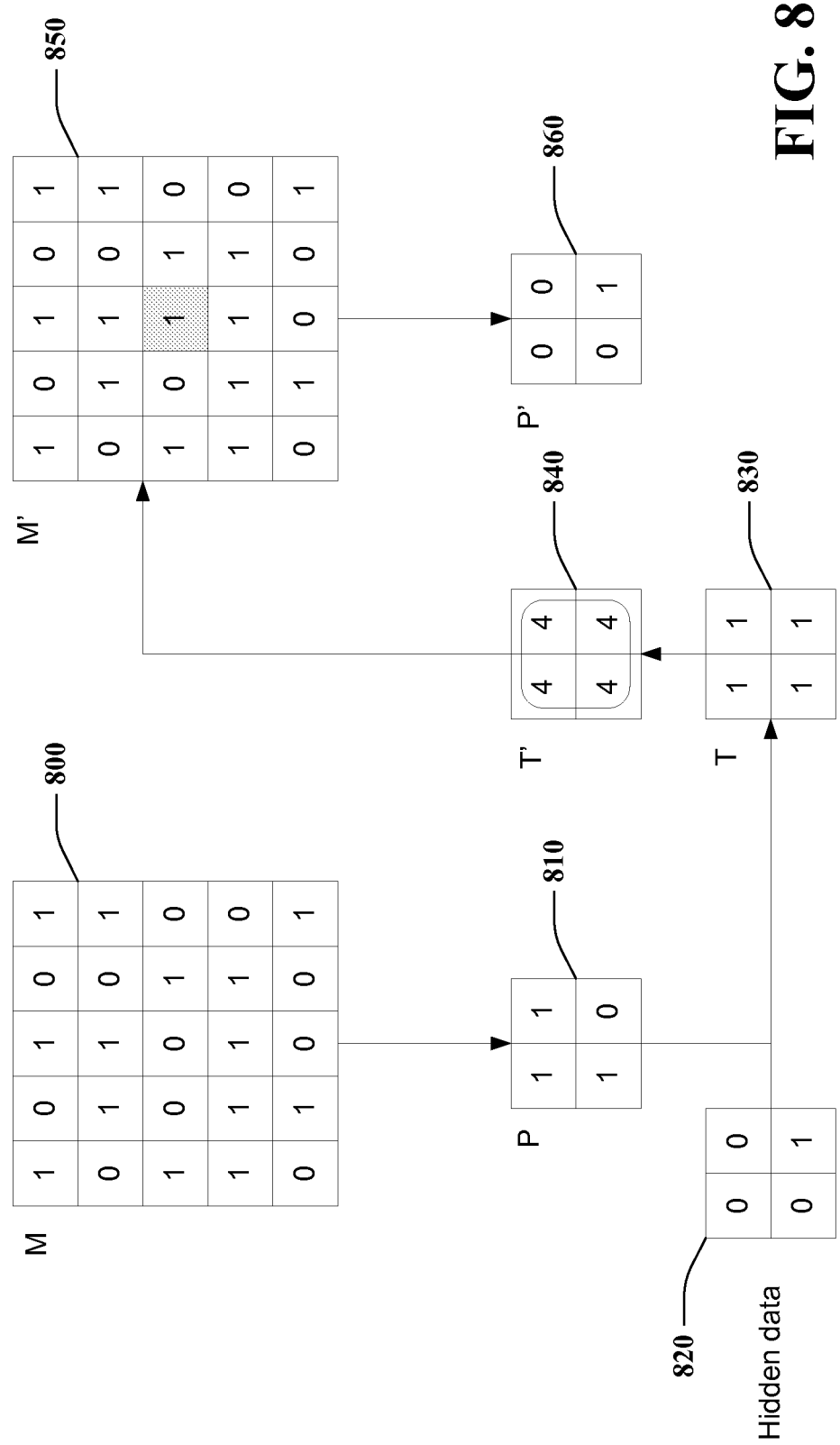
FIG. 8 is a flow diagram of master location decision.

An exemplary process of finding which master pixel to toggle is illustrated in FIG. 8, where the memory map with the pixel changes 850 has a shaded location toggled since a group 4 block 840 was present in the bubbled toggle map 840. In FIG. 8, map 830 represents the toggle map, data 820 represents the hidden data to add to data P 810, which is a sub-block of memory map without pixel changes 800. After finding the set of master pixel locations to be toggled, smart pair toggling can be performed on the halftone image. The complementary toggling partner appears in the slave pixel group.

Figure 9:
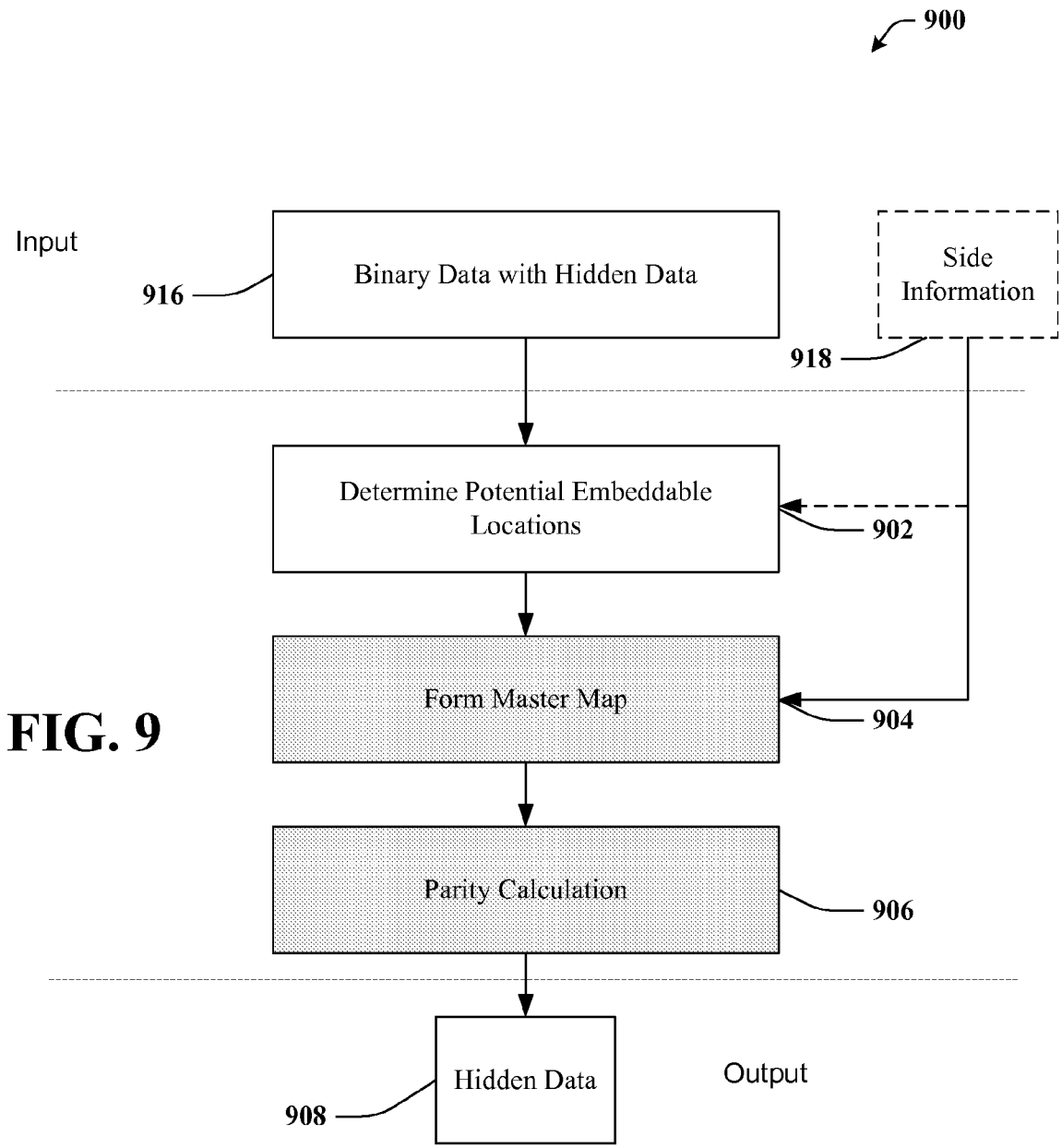
FIG. 9 is a high-level data flowchart of decoding hidden data according to one embodiment.

Referring to FIG. 9, a summary of the decoding process 900 according to this example is illustrated. The decoding process 900 has inputs of the halftone image with hidden data 916 and optionally side information 918. In this example, the side information 918 can include the seed K or the location mapping table. At 902, the potential embedding locations are determined, such as by using the seed K and Data Hiding Smart Pair Toggling or determined using the location mapping table. At 904, a master map is formed. As shown in FIG. 8, this memory map 850 is different from the original memory map 800 in the encoding process. At 906, a parity calculation is performed on the memory map 850. The calculation is performed in the same manner as when the halftone image was being encoded. Without any attack, the parity map, e.g., parity map 860 of FIG. 8, is the hidden data 908.

Experiments were conducted to match the theoretical results with real world images. In particular, Block Overlapping Parity Check was applied to halftone images generated with error diffusion. The images used for the experiments are standard images Lena, Baboon, Peppers, Barbara, Pentagon, Fishingboat and F16, which are all 512×512 in size. As non-limiting examples, both a 4096 bit hidden data string and 16384 hidden data bits string were embedded.

Visual artifacts in images are mainly caused by pair toggling in both techniques. Thus, the number of total toggling directly affects the visual quality of the watermarked image. Block Overlapping Parity Check reduces the number of toggling needed and thus produces less visual artifacts.

TABLE 4

| | | Payload: | | | |
|---|---|---|---|---|---|
| | | 4096 bits | | 16384 bits | |
| Image | Baseline | DHSPT | BOPC | DHSPT | BOPC |
| Lena | 26.96 | 26.58 | 26.77 | 25.72 | 26.22 |
| Baboon | 22.76 | 22.60 | 22.66 | 22.15 | 22.39 |
| Peppers | 26.56 | 26.22 | 26.38 | 25.39 | 25.86 |
| Barbara | 24.38 | 24.12 | 24.25 | 23.52 | 23.86 |
| Pentagon | 24.46 | 24.24 | 24.34 | 23.66 | 23.97 |
| Fishingboat | 25.73 | 25.40 | 25.57 | 24.66 | 25.09 |
| F16 | 25.98 | 25.68 | 25.81 | 24.96 | 25.36 |
| Average | 25.26 | 24.98 | 25.11 | 24.29 | 24.68 |

TABLE 5

| | Payload: | | | |
| --- | --- | --- | --- | --- |
| | 4096 bits | | 16384 bits | |
| Image | Data Hiding Smart Pair Toggling | Block Overlapping Parity Check | Data Hiding Smart Pair Toggling | Block Overlapping Parity Check |
| Lena | 2113 | 1079 | 8436 | 4372 |
| Baboon | 1971 | 1088 | 7914 | 4304 |
| Peppers | 2081 | 1100 | 8465 | 4310 |
| Barbara | 2137 | 1112 | 8503 | 4376 |
| Pentagon | 2035 | 1075 | 8148 | 4345 |
| Fishingboat | 2205 | 1082 | 8718 | 4328 |
| F16 | 2021 | 1084 | 8364 | 4337 |
| Average | 2080 | 1089 | 8364 | 4339 |

In the experiments, an objective quality measure used is the modified peak signal-to-noise ratio (MPSNR), which is the PSNR (peak signal-to-noise ratio) between the original multitone image and a lowpass filtered watermarked halftone image. The MPSNRs of different images using Data Hiding Smart Pair Toggling and Block Overlapping Parity Check are shown in Table 4 above. The comparison of the total pair toggling performed on Lena by the two algorithms is shown in Table 5.

The Block Overlapping Parity Check technique obtains a higher MPSNR over Data Hiding Smart Pair Toggling under the same payload. Furthermore, the number of toggle pairs with Block Overlapping Parity Check is half the number when comparing with that of Data Hiding Smart Pair Toggling.

Champagne Pyramid Embodiment

As previously mentioned, other type of data structures, types of parity calculations and underlying techniques can also be used with the disclosed framework. Champagne Pyramid Parity Check illustrates an alternative embodiment.

Figure 10:
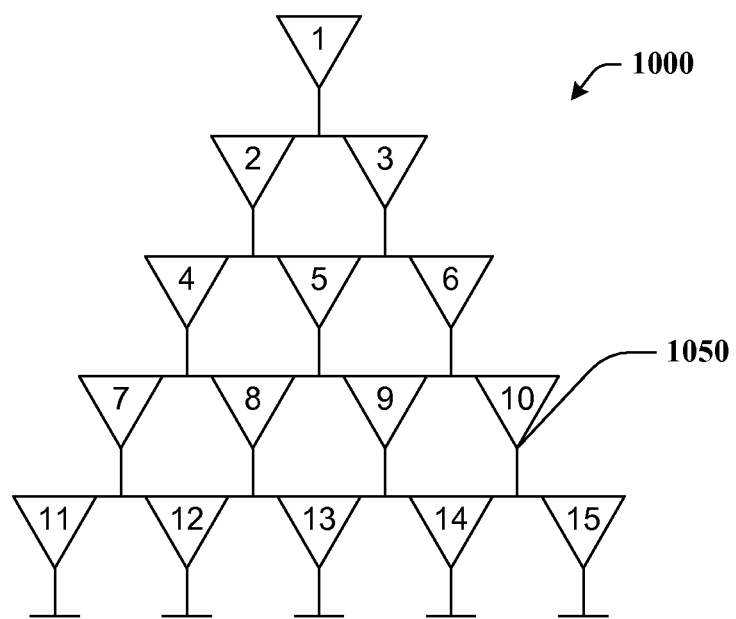
FIG. 10 is a diagram of a champagne pyramid representation of data.

A champagne pyramid parity check technique is motivated by the properties observed in a champagne pyramid. For instance, a two-dimensional, 5-level champagne pyramid 1000 built up by 15 wine glasses with number '1' to '15' is illustrated in FIG. 10. When someone begins to pour from the top, eventually, the champagne finds its way into even the most remote glasses as it overflows a glass 1050 and flows down the pyramid.

If apple-flavored material is placed in glass '4' and champagne is still poured from the top, then after some moments, all the glasses are filled with champagne. However, multiple glasses also have apple-flavored champagne. For example, on the bottom row, three glasses (glasses 11-13) contain apple-flavored champagne while the others (glasses 14-15) do not.

In FIG. 10, glasses '11'-'15' are on the 1st row and glass '1' is on the 5th row. For a pyramid with L-levels, N successive glasses on the bottom row contain the same favor as the glass on the Nth row of the pyramid. In other words, if the same flavoring is desired in N successive glasses on the bottom row, instead of adding flavor on the bottom row N times, flavor can be added into one of the glasses on the Nth row.

The Champagne Pyramid Parity Check is a technique that can improve the perceptible quality of binary data, such as images (e.g., multitonal images) or video, encoded with hidden data by reducing the total number of locations being changed. Champagne Pyramid Parity Check is not a complete data hiding technique and it works together with underlying data hiding techniques to embed data, such as a watermark, into digital images.

Figure 11:
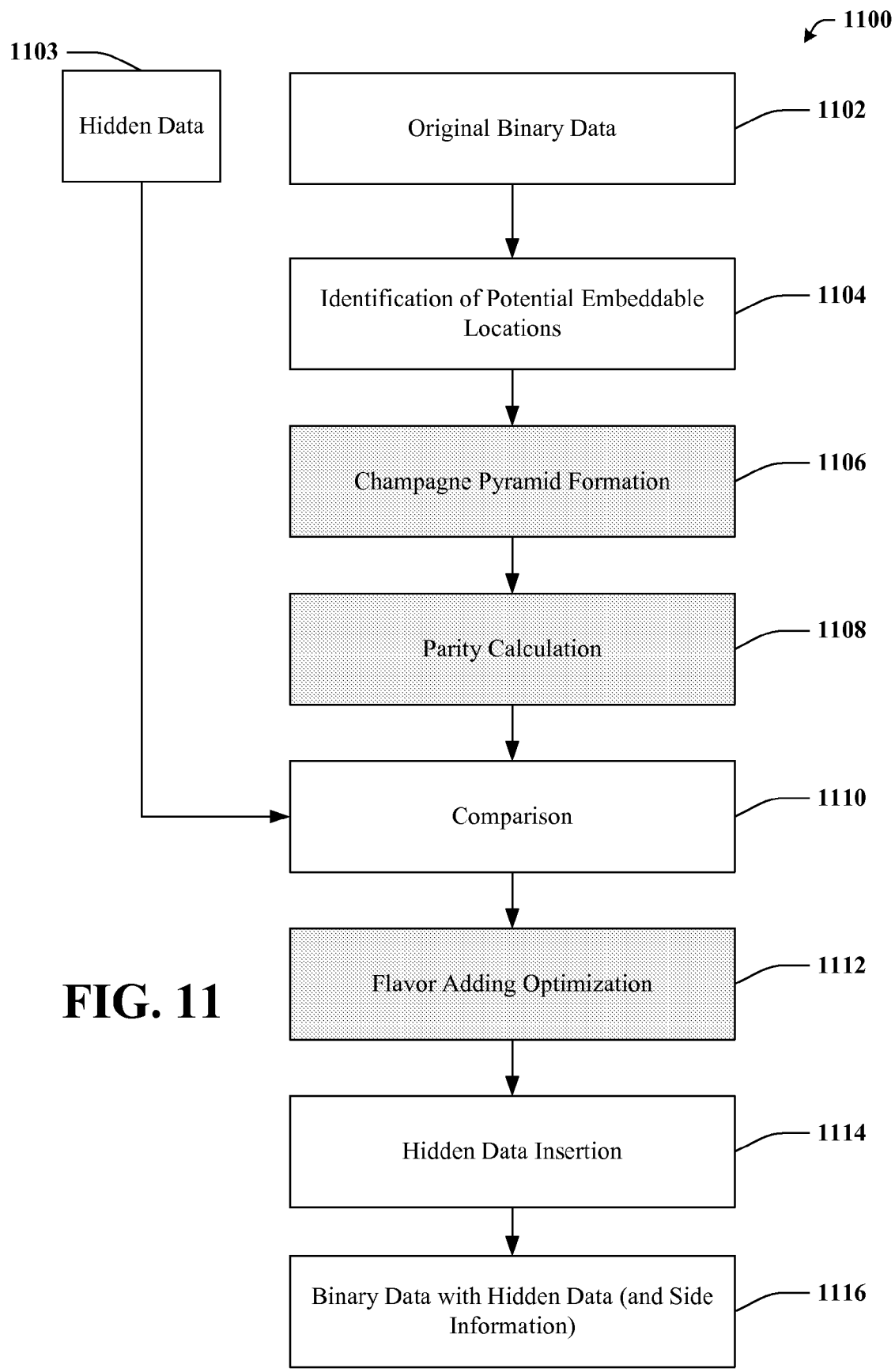
FIG. 11 is a high-level data flowchart according to one embodiment in which a champagne pyramid representation of data is formed.

Referring to FIG. 11, an exemplary non-limiting process 1100 is illustrated showing a representative Champagne Pyramid Parity Check technique. At 1104, potential embeddable locations in original binary data 1102 are identified. At 1106, Champagne Pyramid Formation is carried out. At 1108, parity calculation is performed on the formed champagne pyramid. An array of information bits with the same size of the hidden data is determined during 1108. At 1110, the array is then compared with the hidden data 1103 and each wine glass on the bottom row is decided as either "flavor adding present" or not. At 1112, a flavor adding optimization is performed to find the minimum number of locations where flavors can be added so the bottom row has the designated status. At 1114, hidden data insertion is then performed on the locations marked in the previous step. As a result, binary data with hidden data 1116, and optionally side information, is output.

In particular, a set of embeddable locations and associated binary values are obtained from the underlying technique. Each of these locations is treated as a wine glass (see, e.g., FIG. 10) within a predefined scanning order, or an order that is recorded in a location map. In this example, the number of information bits that can be embedded is equal to the number of wine glasses in the bottom row. However, one can appreciate that for wines glasses corresponding to multiple bit values (e.g., wine glasses correspond to multiple bit values in the binary data), the number of information bits that can be embedded is the number of bits times the number of wine glasses in the bottom row. As the number of embeddable locations M is limited and the hidden data size L is fixed, the number of wine glasses may not be sufficient to build a single L-level champagne pyramid. In such cases, multiple N-level pyramids are built. The constraint of N is described in Equation (3).

$$N \le \frac{2M}{L} - 1 \qquad \text{Equation (3)}$$

In Champagne Pyramid Parity Check, the hidden information depends on the bottom row of the pyramid. Liquid is poured from the top of the champagne pyramid and eventually all glasses on the bottom row are filled up. The Region Of Interest of wine glass n, ROI(N) refers to a set of the glasses that belong to the possible paths from the top glass to glass n. In FIG. 10, ROI('11')={'1', '2', '4', '7', '11'} and ROI ('13')= {'1', '2', '3', '4', '5', '6', '8', '9', '13'}.

Each wine glass in the pyramid represents an embeddable location and its binary value (or multiple but values). Thus, in one embodiment, each wine glass in the pyramid contains a value of either '0' or '1'. When calculating parity, the occurrence of '1's is counted in the region of interest of each glass on the bottom row. If it is an even number, the parity of that glass is set to '0'. Similarly, if it is an odd number, the parity is set to '1'. One can appreciate that the parity can be reversed in other embodiments. After the calculations, an information array with the same size as the hidden data is formed. An example of parity calculation 1200 is shown in FIG. 12 resulting in an information array 1250.

For each entry on the bottom row, the region of interest is first defined and then counting is involved. This brute force technique consumes a large amount of computation power. To reduce the computation complexity, properties of the ROI can be exploited for a more efficient algorithm. In particular, FIG. 13 illustrates the Left Source 1310 of x 1350, LS(x); Right Source 1320 of x 1350, RS(x); and Upper Source 1300 of x 1350, US(x). In some cases, LS(x), RS(x) or US(x) does not exist. The ROI of a non-existing entry is the empty set. The properties of the ROI are shown in Equations (4) and (5). The parity information in a node is calculated as shown in Equation (6).

$$ROI(US(x))=ROI(LS(x))\cup ROI(RS(x))$$ Equation (4)

$$ROI(x)=ROI(LS(x))\cup ROI(RS(x))+\{x\}$$

$$ROI(x)=ROI(LS(x))+ROI(RS(x))-ROI(US(x))+\{x\}$$ Equation (5)

$$\text{Parity}(x)=\text{Parity}(LS(x))\oplus\text{Parity}(RS(x))\oplus\text{Parity}(US(x))\oplus x$$ Equation (6)

Using Equation (6), an efficient parity calculation method is developed. A scan of each row is made starting at the top of the pyramid and each node is processed in increasing order of the glass number, as shown in FIG. 10. If US(x) is '0', no operation is performed. Otherwise, the value of the LS(x), RS(x) and x are updated as shown in FIG. 14 for the representative example.

Figure 15:
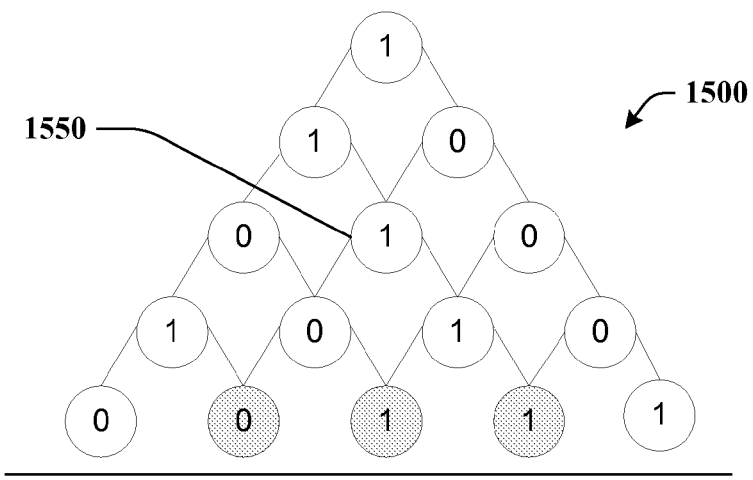
FIG. 15 illustrates a process for determining modifications to be made before any manipulations are made to the champagne pyramid representation of data and what manipulations are to be subsequently performed on the champagne pyramid representation of data.

As illustrated in FIG. 15, the information array 1520 is compared with the hidden data array 1530 being embedded using exclusive-OR (xor) operator. For each value of '1' that appears in the resulting toggle array 1540, the corresponding location on the bottom row of the pyramid is marked as to be flavored. Theoretically, a wine glass on the bottom row is marked as to be flavored with a probability of 0.5. Since adding flavor into N successive wine glasses on the bottom row can be replaced by adding flavor into one wine glass on the Nth row, those manipulations are performed to reduce the number of locations in the binary data modified.

Thus, an example of a flavor adding optimization 1500 is illustrated in FIG. 15. Given the pyramid 1500 and a 5-bit hidden data 1530 {11000}, after toggling with the information array 1520, the resulting toggle array 1540 is {01110}. The $2^{nd}$ $3^{rd}$ and $4^{th}$ glasses on the bottom row are marked as flavored (as shown by the shaded circles). However, instead of toggling all three glasses, one glass 1550 on the $3^{rd}$ row is sufficient.

Figure 16:
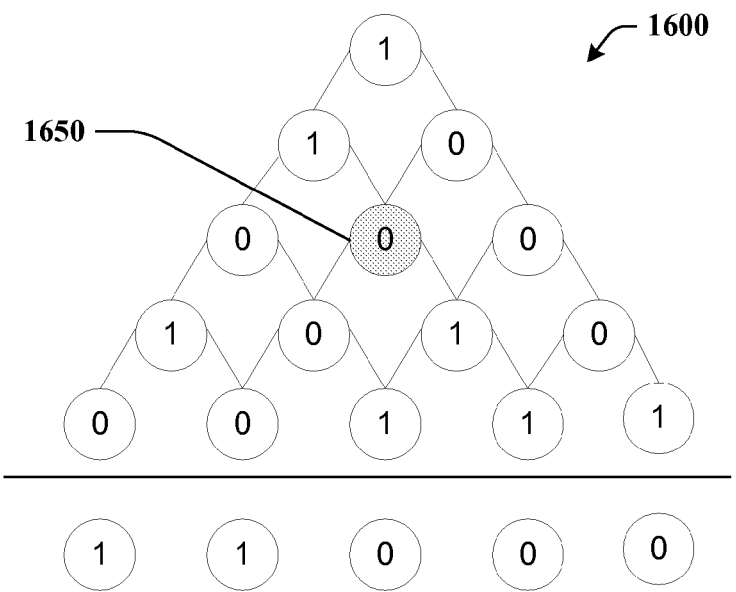
FIG. 16 illustrates an exemplary process for decoding of hidden data using a champagne pyramid representation of data.

Referring to FIG. 16, the resulting champagne pyramid 1600 in the decoding process is illustrated. The champagne pyramid was constructed using the same locations in the same order as performed during 1106. However, glass 1650 corresponding to 1550 was toggled. The parity values of the bottom row are equal to the hidden data 1680.

Theoretical and experimental analysis of Champagne Pyramid Parity Check is performed to show the effect optimization has on reducing the number of locations modified. Without prior information, the probability of a change being needed in an embeddable site, pChange, is assumed to be 0.5.

In order to determine the pChange with Champagne Pyramid Parity Check, a number of definitions are needed. In an ilevel pyramid, C(i) is the number of possible combinations on the bottom row. nChange(i) represents the number of changes needed in hidden data insertion for all combinations. nSize(i) describes the number of nodes on the bottom row in all combinations. Equations (7)-(9) represent some of their relationships, as follows:

$$pChange(i) = \frac{nChange(i)}{nSize(i)}$$ Equation (7)

$$nSize(i) = i \cdot C(i)$$ Equation (8)

$$C(i) = 2^i$$ Equation (9)

nchange(i) is the counter of the number of group of successive TBF glasses in all cases. If the two series of binary bits are grouped together, the number of group of successive '1' in the combined series is equal to the sum of the number of group of successive '1' of two separated series unless the two values on both sides of the joining edge are '1'. In such cases, there is an overcounting by 1. Accordingly, Equations (10)-(15) are derived as follows:

$$-\frac{C(i)\cdot C(j)}{4}$$ Equation (10)

$$nSize(i+j) = (i+j)\cdot C(i)\cdot C(j)$$ Equation (11)

$$pChange(i+j) = \frac{nChange(i)}{(i+j)\cdot C(i)} + \frac{nChange(j)}{(i+j)\cdot C(j)} - \frac{1}{4\cdot(i+1)}$$ Equation (12)

$$pChange(i+1) = \frac{nChange(i)}{(i+1)\cdot C(i)} + \frac{1}{2\cdot(i+1)} - \frac{1}{4\cdot(i+1)}$$ Equation (13)

$$= \frac{i}{(i+1)}\cdot pChange(i) + \frac{1}{4\cdot(i+1)}$$

$$pChange(2i) = 2\cdot\frac{nChange(i)}{2i\cdot C(i)} - \frac{1}{8i} = pChange(i) - \frac{1}{8i}$$ Equation (14)

$$pChange(\infty) = pChange(1) - \frac{1}{8}\sum_{n=0}^{\infty}\left(\frac{1}{2}\right)^n = \frac{1}{2} - \frac{1}{4} = \frac{1}{4}$$ Equation (15)

Based on Equation (15), the lower boundary of the expected pChange with the champagne pyramid parity check is 0.25. The table below indicates some of the values of the expected pChange. In practice, the number of embeddable locations is not enough for building a huge pyramid. For example, when embedding a 16384 bits binary logo into the LSB bit-plane of a 512×512 grayscale image, the maximum number of available embeddable locations, M, is 262144. With Equation (3), the maximum N is 31. The expected pChange in that case is 0.2581. Recall that the expected pChange without Champagne Pyramid Parity Check is 0.5. Thus, the number of total pixel changes in the binary data is greatly reduced.

To verify the mathematical findings demonstrated, a set of experiments were carried out. Hidden data with 4096 bits were tested with varying N. Thirty random sequences were used simulate the probability of changes needed in an embeddable location. The averaged results are shown in Table 6 below:

TABLE 6

| N | Theoretical pChange | Experimental pChange |
|---|---|---|
| 1 | 0.5000 | 0.4978 |
| 2 | 0.3750 | 0.3742 |
| 3 | 0.3333 | 0.3338 |
| 4 | 0.3125 | 0.3122 |
| 6 | 0.2917 | 0.2921 |
| 8 | 0.2813 | 0.2815 |
| 12 | 0.2708 | 0.2709 |
| 16 | 0.2656 | 0.2659 |

TABLE 6-continued

| N | Theoretical pChange | Experimental pChange |
|---|---|---|
| 64 | 0.2539 | 0.2542 |
| 4096 | 0.2501 | 0.2503 |

The experimental results give similar findings as the theoretical analysis. As N increases, the value of pChange decreases. The lower boundary of the expected pChange is found to be 0.25. Distortion is introduced with any modification on the content of the original binary data. However, the lowered probability of changes needed implies that better quality can be achieved.

One can appreciate that some real-world results are likely to have a slightly higher pChange. For example, most real-world input, such as a halftone image, is unlikely to have an initial probability of 0.5 of '1's or '0's at the potential embeddable locations.

Tree-Based Parity Check Embodiment

Tree-Based Parity Check illustrates another alternative embodiment that uses a different data structure and type of parity calculation.

Figure 17:
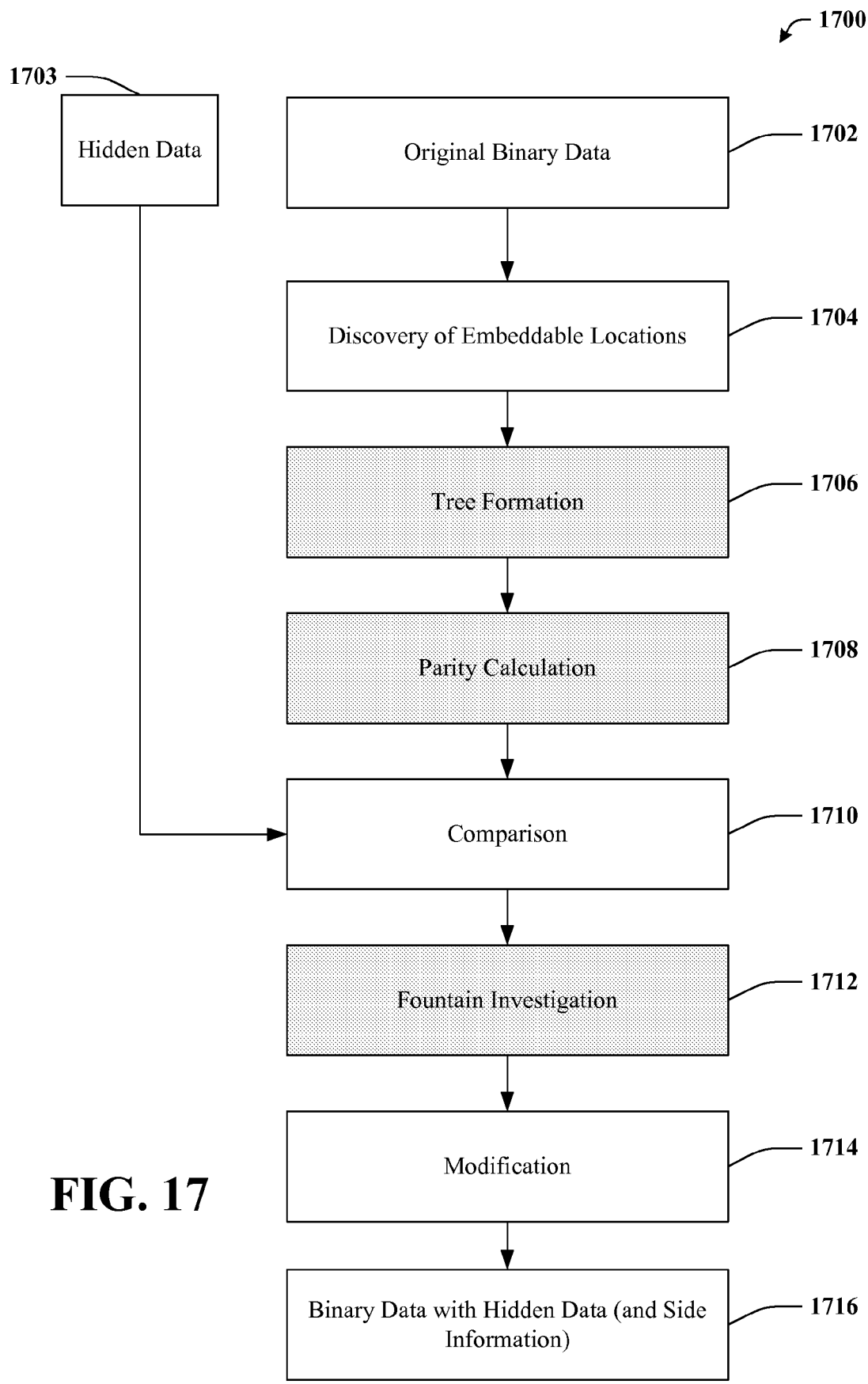
FIG. 17 is a high-level data flowchart according to one embodiment in which a N-ary complete tree is formed.
Figure 18:
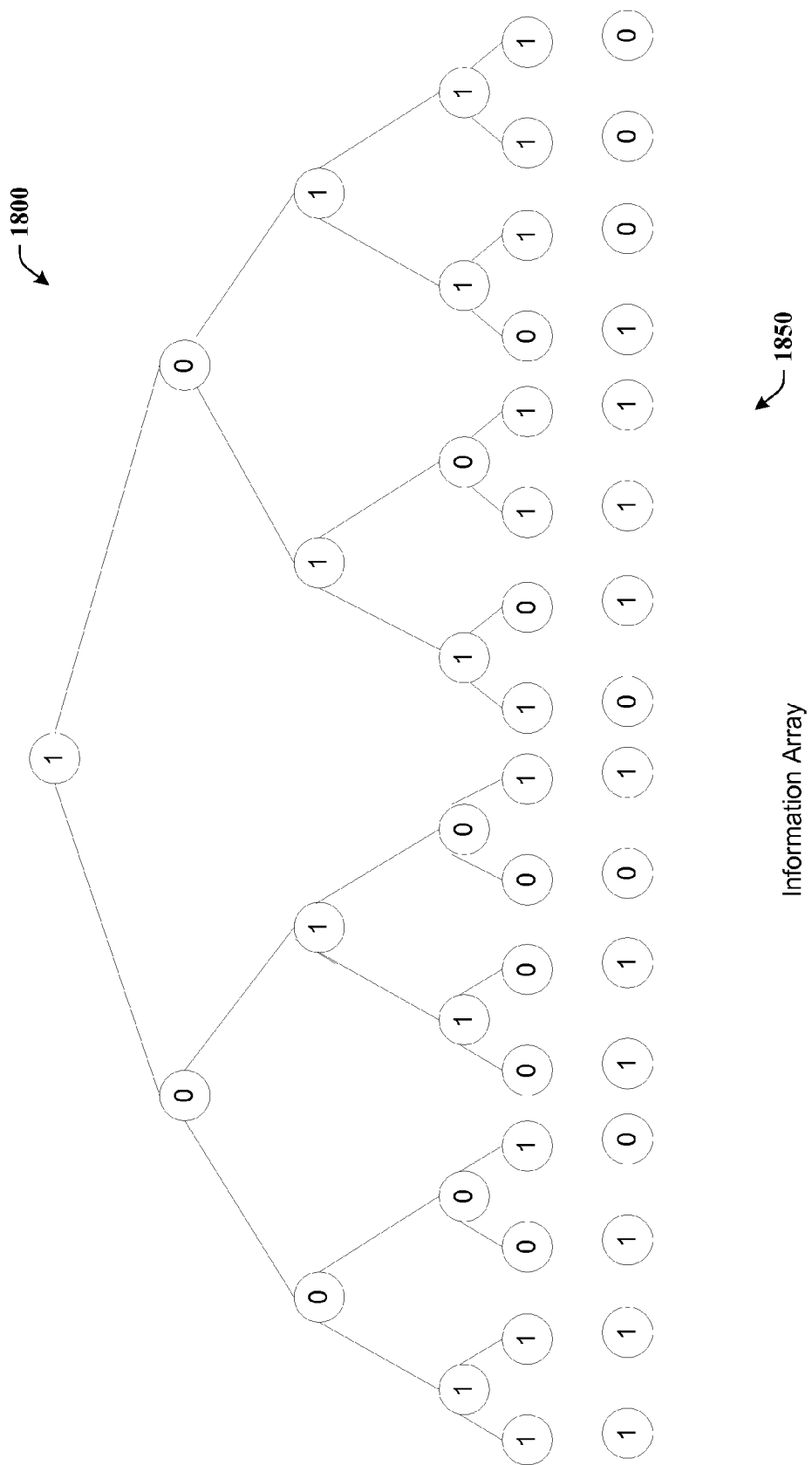
FIG. 18 illustrates parity calculation on an N-ary complete tree.

Referring to FIG. 17, a summary of Tree-Based Parity Check 1700 is illustrated. The inputs are original binary data 1702 and hidden data 1704. At 1704, potential embeddable locations are discovered using an underlying technique. At 1706, an N-ary complete tree, called a Master Tree, is filled with values associated with potential embeddable locations. Except for leaf nodes, nodes of an N-ary complete tree have N child nodes. In the Tree-Based Parity Check technique, one leaf node is used to hold one information bit (for single bit location values). Thus, in order to embed L bits of hidden data, L leaves are used in the Master Tree. A Master Tree 1800 with N equal to two and L equal to sixteen and associated information array 1850 are shown in FIG. 18.

At 1708, parity values are calculated. In order to calculate parity values, the number of '1's is counted when traveling from the leaf node to the root of the Master Tree 1800. If the occurrence of '1' is an odd number, the information bit of the leaf node is said to be '1'. Otherwise, the information bit is said to be '0'. FIG. 18 indicates the resulting parity values.

At 1710, a comparison is performed between information carried by the Master Tree and the hidden data 1703. By performing bitwise logical exclusive-OR (xor) operation between the logo and the information carried by the Master Tree, an array namely toggle array 1930 is obtained. Using the example shown in FIG. 18, the information array 1910 obtained is {1110110101111000}. If the hidden data array 1920 is {0010001001011110}, the resultant toggle array 1930 becomes {1100111100100110}. The toggle array represents a toggle is needed in one of the embeddable locations of the original image when a '1' is present in the array.

Artifacts are introduced by any modification in the binary data. In order to achieve better perceptible quality in the modified binary data, the number of '1's in the toggle array should be minimized. One of the properties of a Master Tree is that a single change in any node, either from '1' to '0' or from '0' to '1', will result in a change in the parity of all its descendant leaf nodes. Thus, instead of changing the value of N sibling nodes in the Master Tree, a single change in their parent node can give the same effect.

In order to utilize the property just mentioned, another tree namely Toggle Tree 1950 is built with the same size as the Master Tree. The leaf nodes are filled up by the toggle array with the same order. The other nodes in the tree are given a value of '0' initially.

Figure 19:
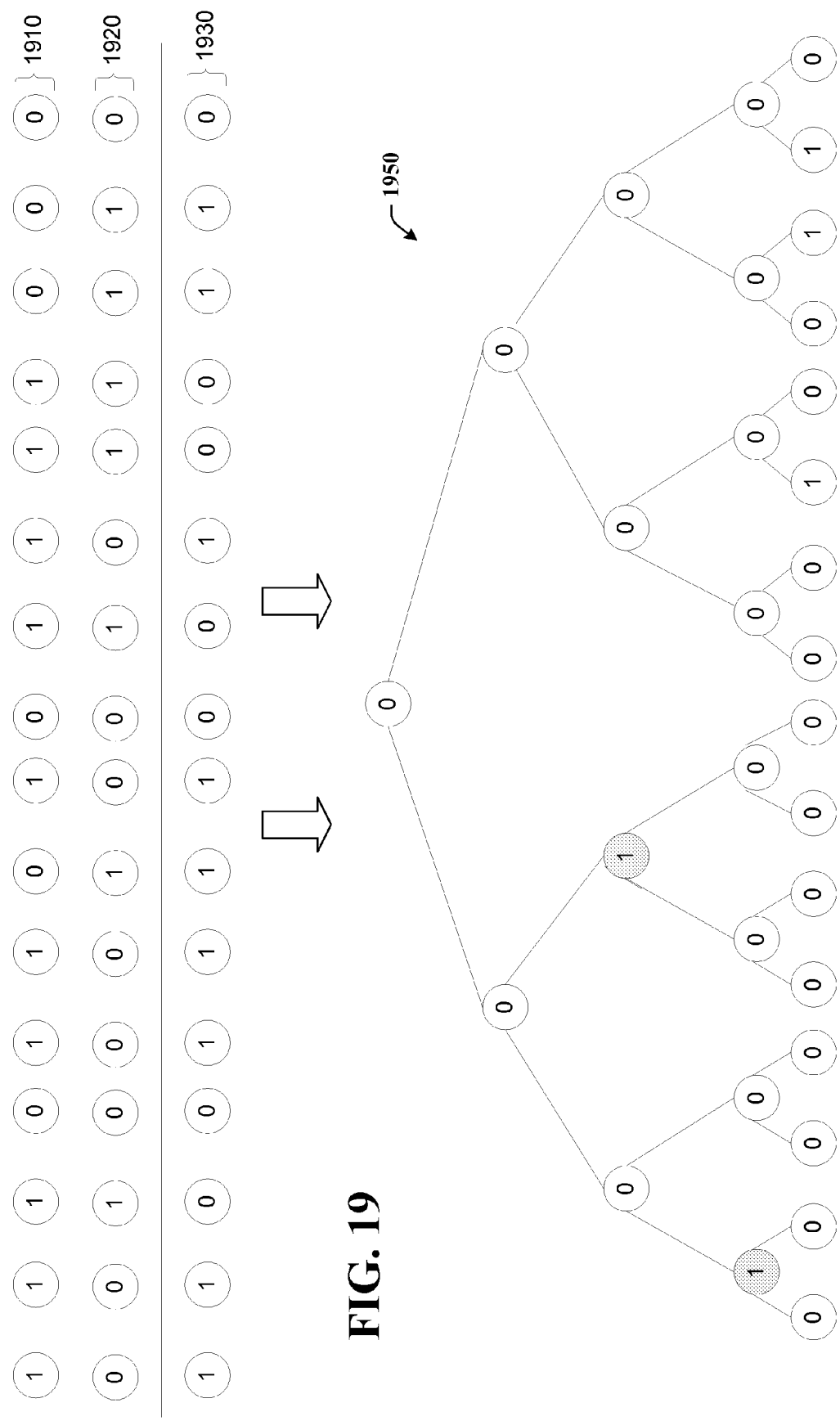
FIG. 19 is an example of fountain investigation, a technique for reducing the number of modifications that exploits properties of parity values in N-ary complete trees.

At 1712, fountain investigation is performed. Fountain investigation is performed from the bottom of the Toggle Tree 1950. For any node with all N of its child nodes are with the value '1', the child nodes are updated with the value '0' and the node being examined is set to '1'. Otherwise, the node being processed is reset to '0'. This example is shown in FIG. 19. In particular, various nodes are switched to '1's instead of the '1's in all of its child nodes. Those nodes are shaded for easy identification.

One can appreciate that Tree-Based Parity Check is not efficient in reducing modifications as champagne pyramid parity check. In particular, two adjacent '1' leaves that are not both child nodes of the same parent are still modified. However, one will also appreciate that the number of modifications is still reduced compared to not using a parity check.

At 1714, modification of locations in the original binary data are performed to produce binary data with hidden data. Side information can also be produced as dictated by the underlying technique. Hidden data is embedded into locations in the original binary data where a corresponding location in the Master Tree has a value of '1' in the Toggle Tree. A map (not shown) correlating the location in the Master Tree with a potentially embedded location can be used as part of determining the location in the binary data and can be included in the optional side information.

Figure 20:
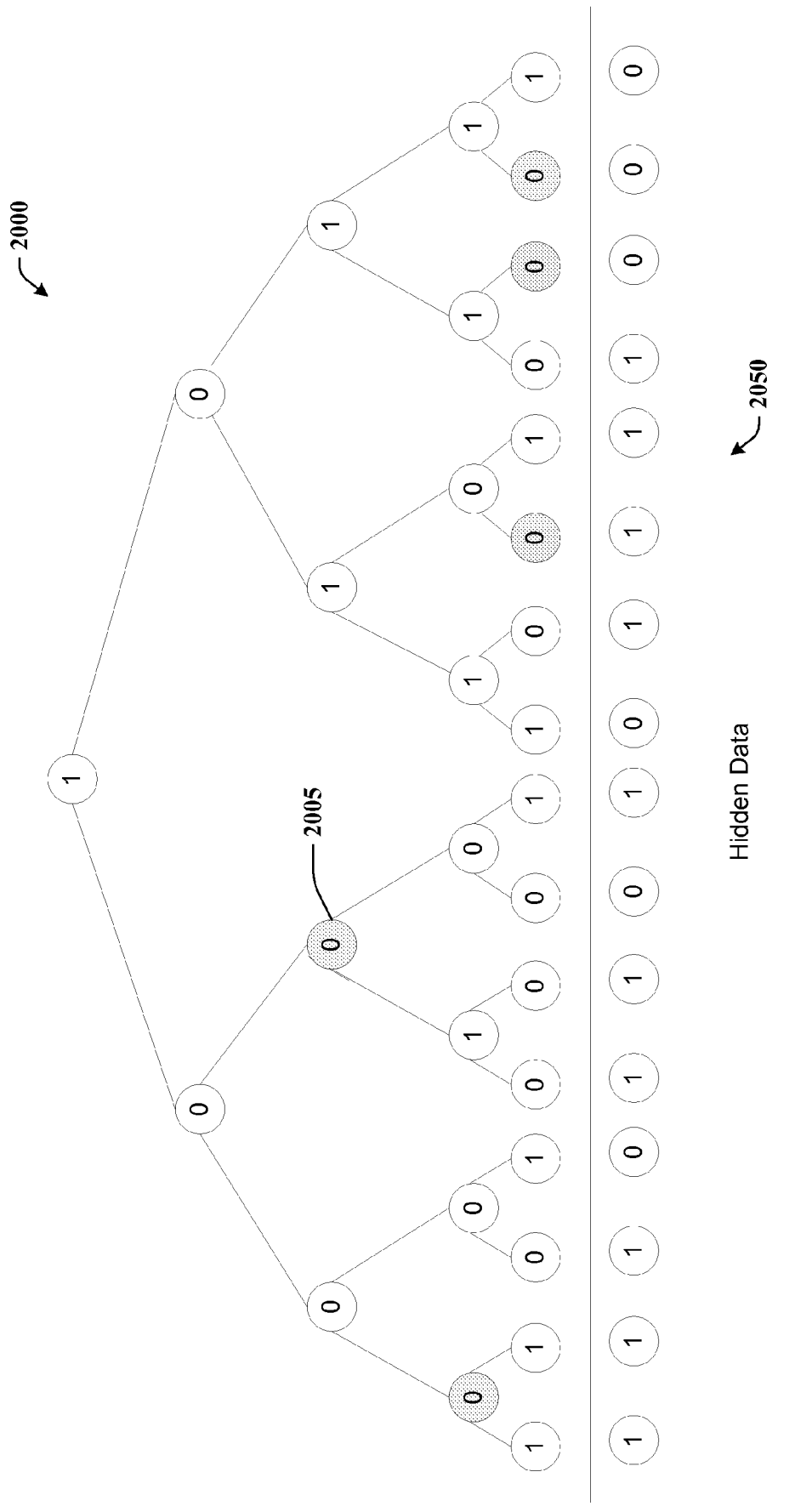
FIG. 20 illustrates an exemplary process for determining hidden data previously encoded in an N-ary complete tree.
Figure 21:
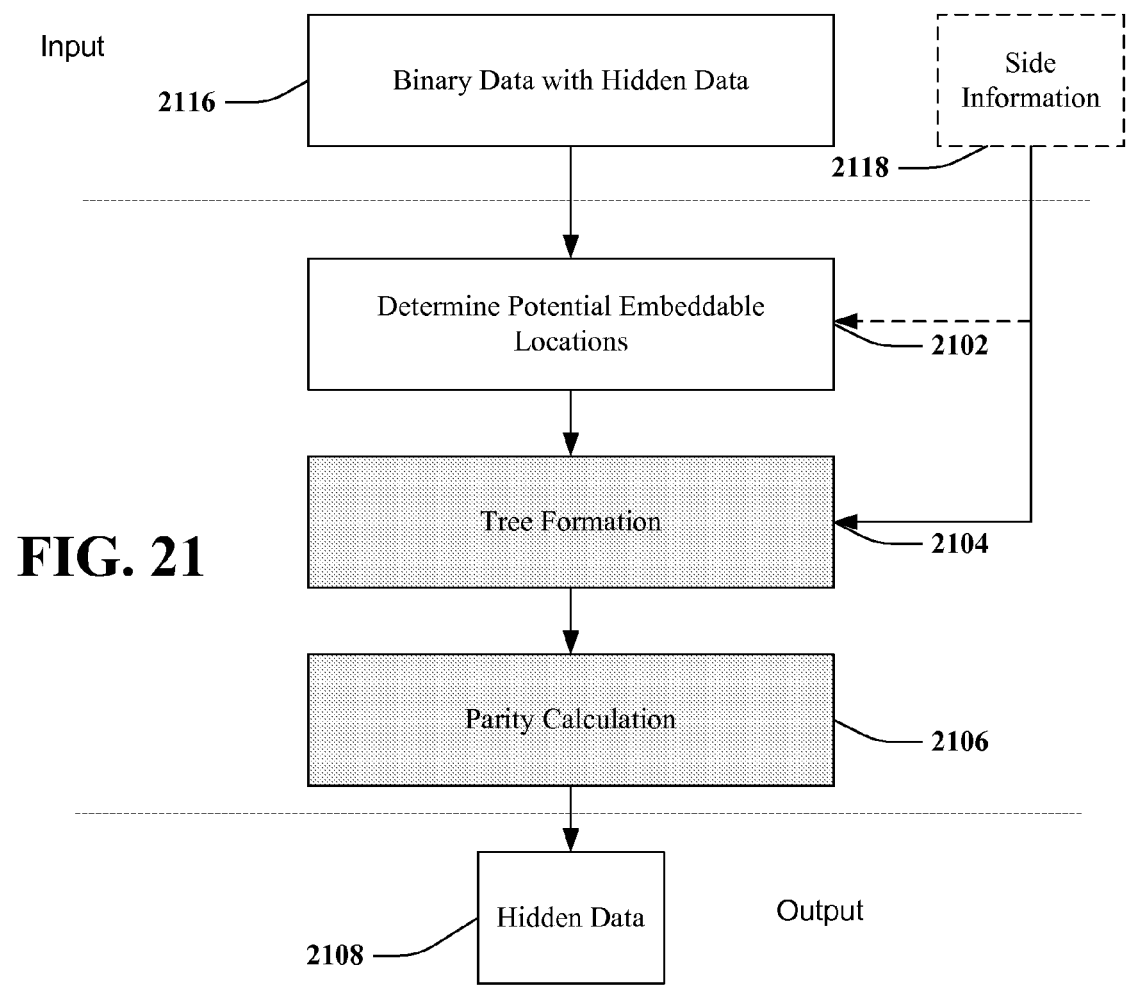
FIG. 21 is a high-level data flowchart for decoding according to one embodiment.

Referring to FIG. 21, the decoding process is summarized. The input is binary data with hidden data, such as a digital watermark, and optionally side information 2118. At 2102, the same potential embedded locations are determined and at 2104, an N-ary complete tree is formed. The formed N-ary complete tree 2000 is illustrated in FIG. 20. After parity calculation at 2106, the information array 2050 found is the same as the hidden data 2108 that was embedded assuming no attacks or processing instructions in the side information.

Analysis of Tree Based Parity Check illustrates the reduction in changes as a function of N and reveals an efficient parity calculation technique. The number of potential embeddable sites in the binary data is limited. Thus, the size of the Master Tree formed is limited. In the Master Tree, there are L leaf nodes. To form an N-ary complete tree with L leaf nodes, the total number of nodes, uNodes, can be found by Equations (16) and (17):

$$nNodes = 1 + N + N^2 + \ldots + N^x, \text{ where } x = \log_N(L)$$

$$= \sum_{i=0}^{x} N^i$$

$$= \frac{NL-1}{N-1} \quad \because N^x = L \quad \text{Equation (16)}$$

$$\approx \left(\frac{N}{N-1}\right)L \quad \because NL \gg 1 \quad \text{Equation (17)}$$

From Equation (17), when N increases, the number of nodes in the entire Master Tree decreases. In other words, as the number of embeddable sites is limited, a larger N is chosen and a higher payload can be embedded. For a fixed hidden data size L and the number of embeddable locations available M, the minimum N can be found with Equation (18):

$$M \geq \frac{NL-1}{N-1}$$ Equation (18)

$$N \geq \left\lceil \frac{M-1}{M-L} \right\rceil$$

As previously mentioned, in most data hiding techniques, the expected percentage of toggling the value at an embeddable site is 50%. Tree Based Parity Check can reduce this in some embodiments.

An "i-levels tree" represents an N-ary complete tree with a height equal to i. The Master Tree in FIG. 18 is an example of a 4-level tree. An i-level tree has one root node and N (i−1)-level trees. For an i-level tree, the number of leaf nodes is defined as L(i). Each of the leaf nodes can be either '1' or '0'. The total different combinations of the leaf nodes is defined as C(i). The properties of L(i) and C(i) are shown in Equations (19)-(22).

$$L(i)=N^i$$ Equation (19)

$$L(i)=NL(i-1)$$ Equation (20)

$$C(i)=2^{L(i)}$$ Equation (21)

$$C(i)=[C(i-1)]^N$$ Equation (22)

nToggle(i) is the number of '1's in all nodes of i-levels of Toggle Tree after fountain investigation by considering all C(i) combinations. pToggle(i) is the expected percentage of toggles needed for any embeddable location. pToggle(i) equals 0.5 without Tree Based Parity Check using the underlying technique. In an i-level tree, there are N (i−1)-levels tree. The combinations of each (i−1)-level tree are repeated C(i)/C(i−1) times. There is an exceptional case, which is the root of all N (i−1)-levels trees is equal to '1'. In that case, those N nodes are reset to '0' and the root of the i-levels tree are set to '1'. The properties of nToggle(i) and pToggle(i) are shown in Equations (23) to (25):

$$nToggle(i) = N \cdot \frac{C(i)}{C(i-1)} \cdot nToggle(i-1) - (N-1)$$ Equation (23)

$$pToggle(i) = \frac{nToggle(i)}{C(i) \cdot L(i)}$$ Equation (24)

$$= \frac{N \cdot \frac{C(i)}{C(i-1)} \cdot nToggle(i-1)}{C(i) \cdot N \cdot L(i-1)} - \frac{N-1}{C(i) \cdot L(i)} =$$ Equation (25)

$$pToggle(i-1) - \frac{N-1}{C(i) \cdot L(i)}$$

pToggle(0) is equal to 0.5. C(i) and L(i) increase exponentially as i increases. Thus, pToggle(i) is a fast converging variable. The calculation results are shown in Table 7.

TABLE 7

| N | Converged pToggle(i) | Converging stage i |
|---|---|---|
| 2 | 0.3589 | 3 |
| 3 | 0.4162 | 2 |
| 4 | 0.4531 | 1 |
| 5 | 0.475 | 1 |

Thus, as N deceases, fewer artifacts are introduced. Thus, in order to achieve better quality in the binary data, the Master Tree should be built with minimum N.

Since it is reasonable to assume that L is much larger than N, the complexity of forming the Master Tree and performing fountain investigation is O(L). The brute force method of parity calculation is O(L $\log_N$ L); however, a smart method with complexity of O(L) is possible.

Parity(x) is the parity of the occurrence of '1's in the path from node x to the root. Thus, parity(x) is equal to parity (parent(x)) plus the value in node x using bitwise addition. A Master Tree is traveled starting from the root of the tree and for every node x being processed, the parity of its child node y is updated by adding the parity of node x and the value of node y. The complexity of this efficient technique of calculating parity is O(L).

ADDITIONAL EMBODIMENTS

One can appreciate that various changes can be performed in other embodiments. For example, instead of coding the hidden data directly, the complement of the hidden data can be encoded. For example, if the initial toggle data structure indicates that a majority of locations is to be modified, then modifications can instead be performed on the minority of locations that are not to be modified and the appropriate processing instructions indicated in the side information so it can be decoded correctly. As a second implementation of complement encoding, calculations can be made to see whether the direct encoding or complement encoding reduces the total number of locations after manipulations (e.g., bubble formation, flavor adding optimization). Although additional processing time is used in encoding, distortion can be reduced even further in the binary data.

Figure 22:
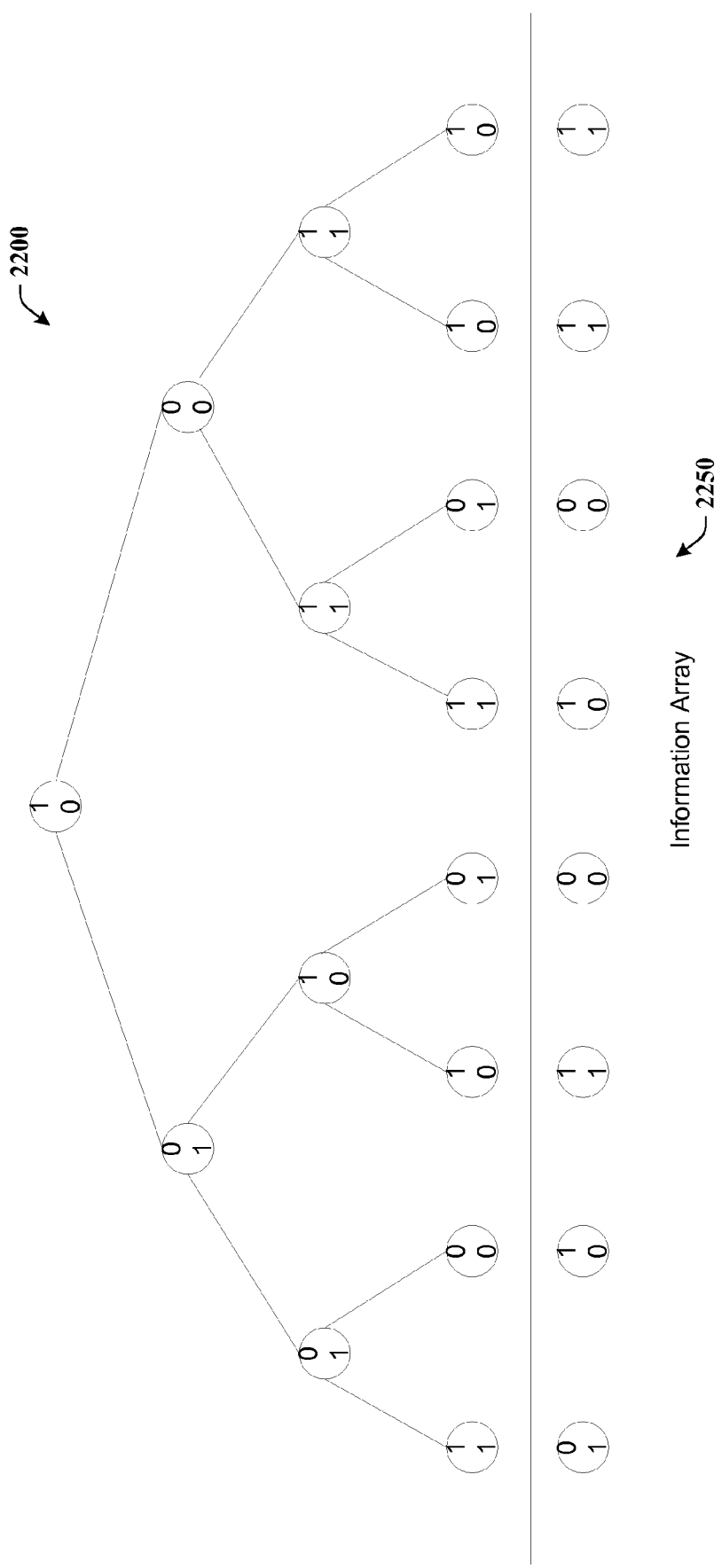
FIG. 22 illustrates a parity calculation with values of more than 1 bit on a N-ary complete tree.

One can appreciate that the framework can be used on different types of binary data, such as multitone images with multiple bit values. FIG. 22 illustrates the process of working with multiple bit values in one embodiment. In particular, FIG. 22 illustrates an N-ary complete tree 2200 in which each tree node corresponds with a 2-bit value. For the sake of simplicity, only a 2-bit value is illustrated but one can appreciate that more bits can be processed in a similar manner. In this example, the parity values are calculated separately for each of the two bits. The calculated parity values are shown in information array 2250. This information array can be then be toggled with hidden data in a top row first then bottom row order or in element order (e.g., top one in first element then bottom one in the second element and so on) Thus, the information array 2250 can be {0110101110100011} or {0110110010001111}, respectively. Processing instructions in the side information can indicate the order if the encoder and decoder have not agreed-upon an order in advance. A toggle tree is then formed with 2-bits according to whether a toggle is needed. Thus, in this example, each bit can still be separately toggled.

One skilled in the art can appreciate that multiple bit values can be determined in other manners, such as creating multiple N-ary complete trees with a single bit and concatenating the resulting information array together to toggle with the hidden data.

In addition, images can be modified in domains other spatial domain. For example, changes to the level of transparency (e.g., alpha channel) can be made to hide data in a multitone raster media. A '0' can correspond to a fully opaque pixel and '1' can correspond to a less-fully opaque pixel. If the level of transparency is small and the hidden data is small, data can be encoded without resorting to multiple bit values.

One will also appreciate that the data structure illustrated are examples and different data structures can be utilized in other embodiments.

Exemplary System Components

Figure 23:
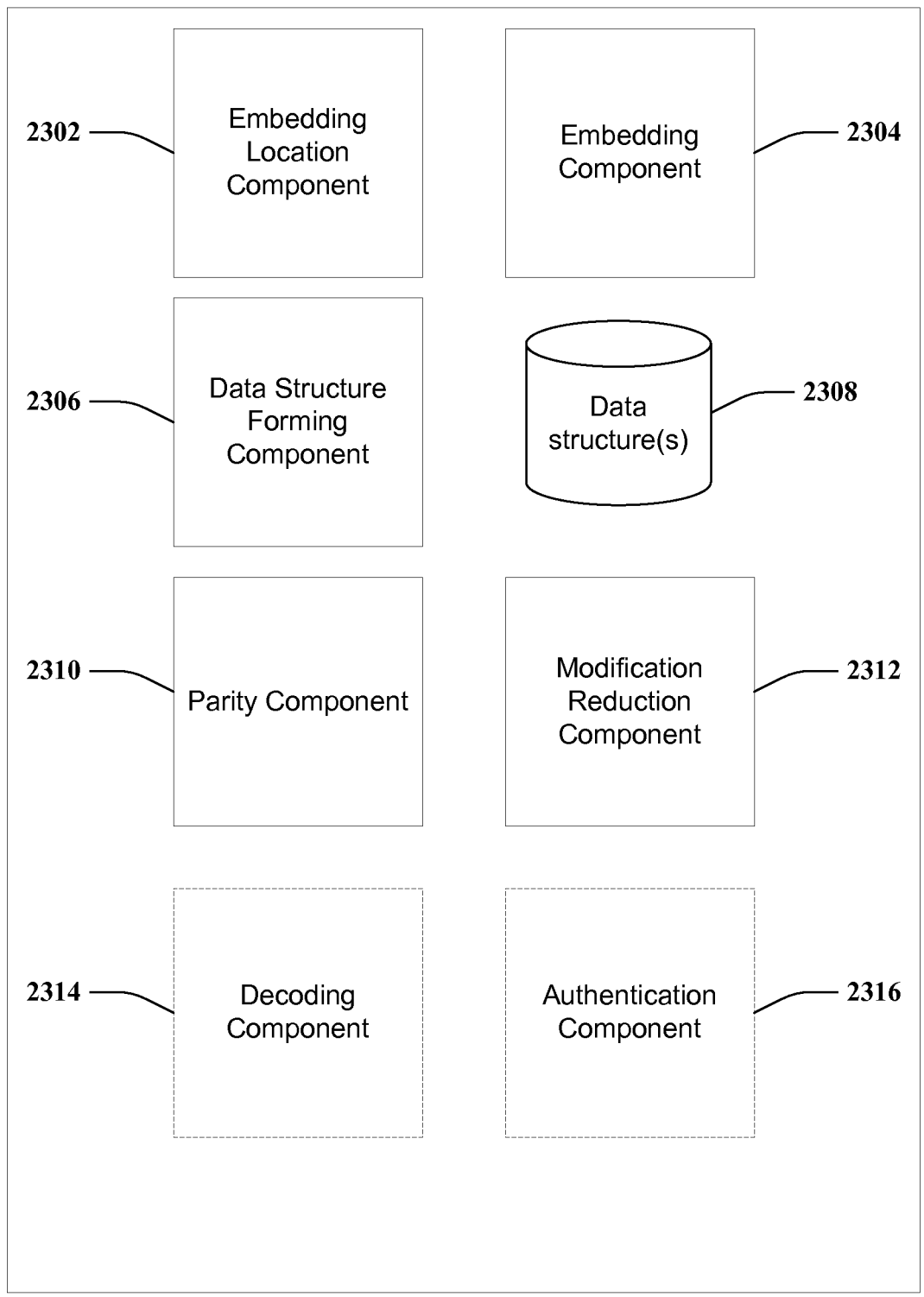
FIG. 23 is a block diagram of a system for encoding and decoding hidden data into binary data.

Referring to FIG. 23, exemplary components of a data hiding system are illustrated. The exemplary system includes an embedding location component 2302, an embedding component 2304, a data structure forming component 2306, a parity component 2310, and a modification reduction component 2312 as well as optional decoding component 2314 and authentication component 2316. In addition to the components, various data structures 2308 associated with encoding and/or decoding are stored in memory.

The embedding location component 2302 determines data locations in binary data according to an underlying technique. For example, random locations are determined using Data Hiding Smart Pair Toggling. The data structure forming component 2306 forms a data structure 2308 in memory with values associated with the determined data locations in the binary data. A location in the formed data structure is associated with a determined location in the binary data. As discussed above, the data structures can include a memory map, an N-ary complete tree or a champagne pyramid. The parity component 2310 calculates parity values for the values in a formed data structure. As previously discussed, parity values can be calculated using a simple technique or an efficient technique that uses properties of a form data structure.

The modification reduction component 2312 initially determines what locations in the binary data need modification to encode a digital watermark based on at least some of the parity values and subsequently reduces a total number of locations needed to encode the hidden data by utilizing properties associated with the formed data structure. For example, the modification reduction component can perform bubble formation, flavor adding optimization, or fountain investigation. In the process, the modification reduction component can form a toggle data structure. The embedding component modifies the reduced number of locations in the binary data according to an underlying technique, such as toggling individual bits.

The decoding component 2314 employs one or more of the other components to decode hidden data. For example, it can use the embedding location component to identify potential embedding locations, the data structure forming component 2306, and the parity component 2310. In some embodiments, side information is used so that the embedding location component is not used. Subsequently, the decoding component 2314 indicates the decoded data such as to a user (e.g., an intellectual property auditor) or to a component, such as the authentication component 2316, for further processing.

In some embodiments, an authentication component 2316 is utilized to verify the authenticity of the binary data. The authentication component 2316 attempts to match the extracted hidden data, such as a digital watermark, to known data. In one example, a known watermark can be sent to the decoder out-of-band for matching or the same watermark pattern can be used for multiple pieces of binary data. For example, a plurality of watermark can be shared between the encoder and decoder and periodically (e.g., hourly, daily) changed. The authenticity component 2316 can indicate the authenticity and as result other actions can be performed. For example, if the authenticity is not confirmed, the binary data can be displayed with a warning or prevented from display entirely.

Exemplary Computing Device

As mentioned, encoding of the hidden data can be performed on any device wherein it may be desirable to encode or decode hidden data in binary data and/or authenticate binary data using an embedded watermark. Similarly, decoding of binary data with hidden data can be performed on any device wherein it may be desirable to authenticate the binary data and/or recover the hidden data. It should be understood, therefore, that handheld, portable and other computing devices and computing objects of all kinds are contemplated for use in connection with the present invention. Accordingly, the below general purpose remote computer described below in FIG. 23 is but one example, and the present invention can be implemented on non-general computing devices, such as smartphones, personal digital assistants, digital photo frames, televisions, set-top boxes, gaming consoles, handheld gaming devices, handheld media players, etc.

Figure 24:
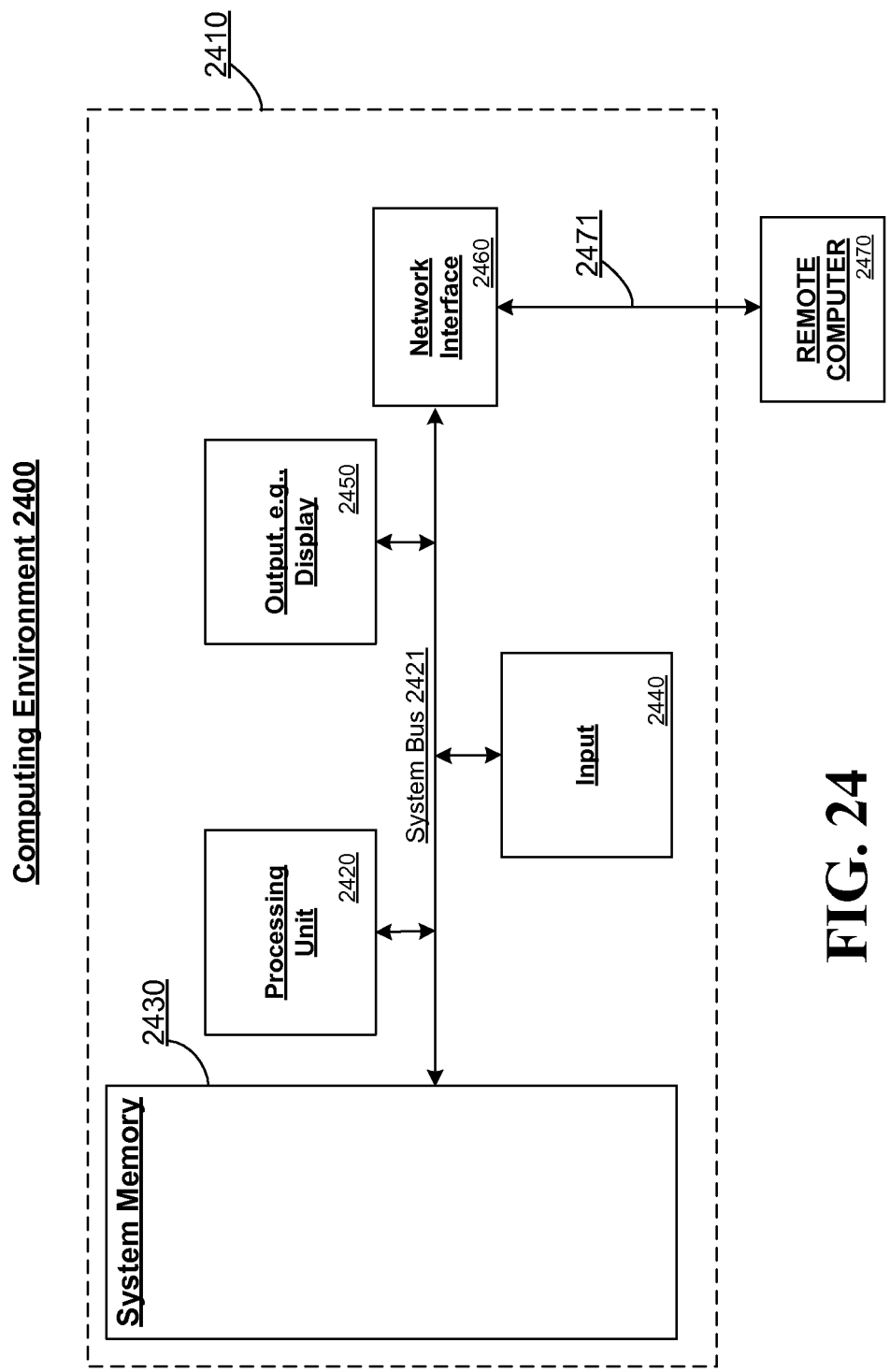
FIG. 24 is a block diagram representing an exemplary non-limiting computing system or operating environment in which one or more embodiments may be implemented.

FIG. 24 thus illustrates an example of a suitable computing system environment 2400 in which the invention may be implemented, however, the computing system environment 2400 is only one example of a suitable computing environment for a media device and is not intended to suggest any limitation as to the scope of use or functionality of the invention. Neither should the computing environment 2400 be interpreted as having any dependency or requirement relating to any one or combination of components illustrated in the exemplary computing system environment 2400.

With reference to FIG. 24, an exemplary remote device for implementing the invention includes a general-purpose computing device in the form of a computer 2410. Components of computer 2410 can include, but are not limited to, a processing unit 2420, a system memory 2430, and a system bus 2421 that couples various system components including the system memory to the processing unit 2420. The system bus 2421 can be any of several types of bus structures including a memory bus or memory controller, a peripheral bus, and a local bus using any of a variety of bus architectures.

Computer 2410 typically includes a variety of computer readable media. Computer readable media can be any available media that can be accessed by computer 2410. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 2410. Communication media typically embodies computer readable instructions, data structures, program modules or other data in a modulated data signal such as a carrier wave or other transport mechanism and includes any information delivery media.

The system memory 2430 can include computer storage media in the form of volatile and/or nonvolatile memory such as read only memory (ROM) and/or random access memory (RAM). A basic input/output system (BIOS), containing the basic routines that help to transfer information between elements within computer 2410, such as during start-up, may be stored in memory 2430. Memory 2430 typically also contains data and/or program modules that are immediately accessible to and/or presently being operated on by processing unit 2420. By way of example, and not limitation, memory 2430 can also include an operating system, application programs, other program modules, and program data.

The computer 2410 can also include other removable/non-removable, volatile/nonvolatile computer storage media. For example, computer 2410 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 2421 through a non-removable memory interface such as an interface, and a magnetic disk drive or optical disk drive is typically connected to the system bus 2421 by a removable memory interface, such as an interface.

A user may enter commands and information into the computer 2410 through input devices such as a keyboard and pointing device, commonly referred to as a mouse, trackball or touch pad. Other input devices may include a microphone, joystick, game pad, satellite dish, scanner, or the like. These and other input devices are often connected to the processing unit 2420 through user input 2440 and associated interface(s) that are coupled to the system bus 2421, but can be connected by other interface and bus structures, such as a parallel port, game port or a universal serial bus (USB). A graphics subsystem can also be connected to the system bus 2421. A monitor or other type of display device is also connected to the system bus 2421 via an interface, such as output interface 2450, which can in turn communicate with video memory. In addition to a monitor, computers may also include other peripheral output devices such as speakers and a printer, which may be connected through output interface 2450.

The computer 2410 can operate in a networked or distributed environment using logical connections to one or more other remote computers, such as remote computer 2470, which can in turn have media capabilities different from device 2410. The remote computer 2470 can be a personal computer, a server, a router, a network PC, a peer device or other common network node, or any other remote media consumption or transmission device, and may include any or all of the elements described above relative to the computer 2410. The logical connections depicted in FIG. 24 include a network 2471, such local area network (LAN) or a wide area network (WAN), but may also include other networks/buses. Such networking environments are commonplace in homes, offices, enterprise-wide computer networks, intranets and the Internet.

When used in a LAN networking environment, the computer 2410 is connected to the LAN 2471 through a network interface or adapter. When used in a WAN networking environment, the computer 2410 typically includes a communications component, such as a modem, or other means for establishing communications over the WAN, such as the Internet. A communications component, such as a modem, which may be internal or external, may be connected to the system bus 2421 via the user input interface of input 2440, or other appropriate mechanism. In a networked environment, program modules depicted relative to the computer 2410, or portions thereof, may be stored in a remote memory storage device. It will be appreciated that the network connections shown and described are exemplary and other means of establishing a communications link between the computers may be used.

Various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to encode or decode hidden data or authenticate raster media using a watermark.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Furthermore, the disclosed subject matter can be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via the flowcharts, it can be appreciated that various other branches, flow paths, and orders of the blocks, may be implemented which achieve the same or a similar result. Moreover, not all illustrated blocks may be required to implement the methodologies described.

While the present invention has been described in connection with the preferred embodiments of the various figures, it is to be understood that other similar embodiments may be used or modifications and additions can be made to the described embodiment for performing the same function of the present invention without deviating therefrom. For example, the exemplary computing device can be a gaming console, handheld computer, portable computer, etc., whether wired or wireless, and may be applied to any number of such computing devices connected via a communications network, and interacting across the network.

Still further, the present invention can be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A system, comprising:
a processor, communicatively coupled to a memory, that facilitates execution of instructions to perform operations, comprising:
creating a data structure including values associated with respective embeddable data locations in binary data;
determining respective parity values for the values associated with the respective embeddable data locations; and
a performing a bitwise xor operation between at least a portion of the respective parity values and at least a portion of hidden data to yield a toggle data structure indicating a subset of the embeddable data locations that facilitate encoding the hidden data.

2. The system of claim 1, wherein the data structure includes at least one of a master map, an N-ary complete tree, or a champagne pyramid.

3. The system of claim 1, wherein the binary data includes at least one of image data, audio data, or video data.

4. The system of claim 1, wherein the operations further comprise decoding at least the portion of the hidden data including a digital watermark to obtain a decoded watermark.

5. The system of claim 4, wherein the operations further comprise comparing the decoded watermark to at least one other watermark.

6. The system of claim 1, wherein at least the portion of the hidden data includes a digital watermark.

7. The system of claim 1, wherein the operations further comprise reducing a number of the subset of the embeddable data locations based on one or more properties associated with the data structure to yield a reduced number of embedding locations.

8. The system of claim 7, wherein the operations further comprise encoding the hidden data in the binary data based on the reduced number of embedding locations.

9. The system of claim 7, wherein the reducing comprises reducing the number of the subset of the embeddable data locations by bubble formation on the toggle data structure.

10. The system of claim 7, wherein the reducing comprises reducing the number of the subset of the embeddable data locations by a champagne pyramid parity check on the toggle data structure.

11. The system of claim 7, wherein the reducing comprises reducing the number of the subset of the embeddable data locations by a tree-based parity check on the toggle data structure.

12. A method, comprising:
forming a data structure including values associated with respective embedding locations in binary data;
determining parity values for the values associated with the respective embedding locations; and
generating, by a computing device, a toggle tree based on a result of a bitwise xor operation between one or more of the parity values and at least a portion of hidden data, wherein the toggle tree identifies a subset of the embedding locations that facilitate encoding the hidden data.

13. The method of claim 12, further comprising:
reducing a number of the subset of the embedding locations indicated by the toggle tree based on a property of at least one of the data structure or the toggle tree resulting in a reduced number of embedding locations.

14. The method of claim 13, wherein the forming the data structure includes forming a N-ary complete tree, wherein N is an integer greater than one.

15. The method of claim 14, wherein the reducing the number of the subset of the embedding locations includes modifying a node of the N-ary complete tree in response to the toggle tree instructing modification of all leaf nodes associated with the node.

16. The method of claim 13, wherein the forming the data structure includes forming a champagne pyramid.

17. The method of claim 16, wherein the reducing the number of the subset of the embedding locations includes modifying a value of an Nth row from a bottom row of the champagne pyramid in response to the toggle tree instructing modification of N successive locations on the bottom row, where N is an integer greater than one.

18. The method of claim 13, wherein the reducing the number of the embedding locations includes performing bubble formation on the toggle tree.

19. The method of claim 13, further comprising:
embedding a digital watermark in the binary data based on the toggle tree in accordance with the reduced number of embedding locations.

20. The method of claim 12, further comprising:
identifying at least one embedding location of the respective embedding locations according to a spatial domain analysis of the binary data.

21. The method of claim 12, further comprising generating side information including at least one of identification of the respective embedding locations, information regarding a technique used to identify the respective embedding locations, or identification of a type of the data structure.

22. The method of claim 12, wherein the determining includes determining the parity values based on at least one property associated with a previously calculated parity value.

23. The method of claim 12, further comprising embedding the hidden data in the binary data based on an output of the bitwise xor operation.

24. A non-transitory computer-readable medium including computer-executable instructions that, in response to execution, cause a computing device to perform operations comprising:
- deriving a data structure including information of embeddable locations in data;
- determining parity values for the embeddable locations;
- performing a bitwise xor operation on at least a portion of the party values and at least a portion of hidden data; and
- identifying a subset of the embeddable locations that facilitate embedding at least the portion of the hidden data in the data based on a result of the performing the bitwise xor operation.

* * * * *